United States Patent [19]

Maeshima et al.

[11] Patent Number: 4,985,760
[45] Date of Patent: Jan. 15, 1991

[54] COLOR IMAGER HAVING VARYING FILTER APERTURE SIZES TO COMPENSATE FOR LUMINANCE DIFFERENCES BETWEEN COLORS

[75] Inventors: Katsuyoshi Maeshima; Atsushi Takeda, both of Yokohama; Shinobu Arimoto; Shizuo Hasegawa, both of Tokyo, all of Japan

[73] Assignee: Canon Kabushiki Kaisha, Tokyo, Japan

[21] Appl. No.: 253,671

[22] Filed: Oct. 5, 1988

[30] Foreign Application Priority Data

Oct. 9, 1987 [JP] Japan ................................ 62-255069
Oct. 23, 1987 [JP] Japan ................................ 62-268847
Nov. 17, 1987 [JP] Japan ................................ 62-291593

[51] Int. Cl.$^5$ .............................................. H04N 1/46
[52] U.S. Cl. ........................................ 358/80; 358/50; 358/75
[58] Field of Search .................... 358/75, 80, 41, 44, 358/50, 51

[56] References Cited

U.S. PATENT DOCUMENTS 4,481,530  11/1984  Wagensonner et al. ......... 358/41 X

*Primary Examiner*—James J. Groody
*Assistant Examiner*—Mark R. Powell
*Attorney, Agent, or Firm*—Fitzpatrick, Cella Harper & Scinto

[57] ABSTRACT

A color image reading apparatus includes a plurality of line sensors which have different color filters and each of which has a plurality of light receiving elements. One of the plurality of line sensors (for the color blue) has an opening width larger than those of the remaining line sensors. The apparatus also includes a correcting unit such as an edge emphasis circuit for correcting image signals output from the line sensors so as to obtain identical resolutions of the image signals, and a processing unit such as a masking circuit for performing color processing of the image signals corrected by the correcting unit.

7 Claims, 21 Drawing Sheets

DISTRIBUTION OF SPECTRAL ENERGY

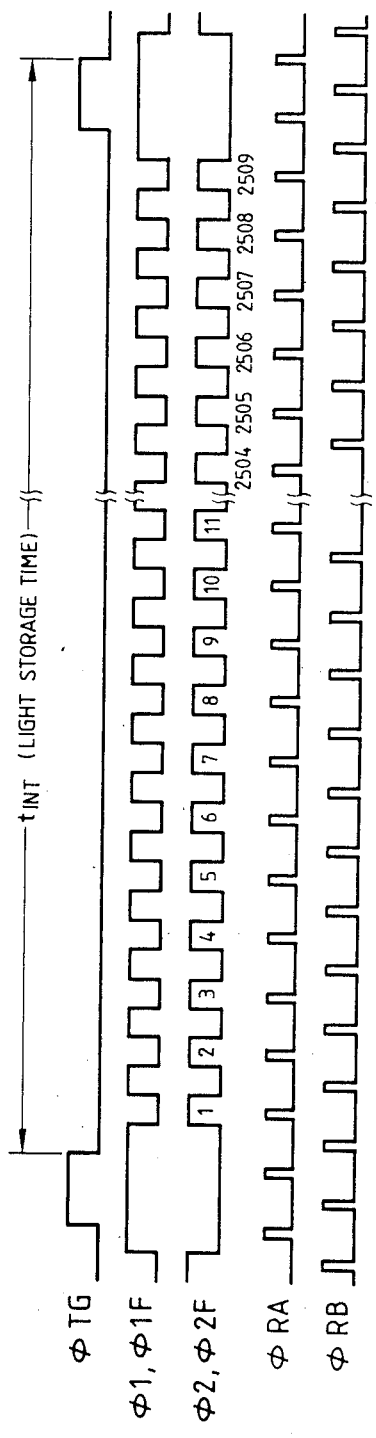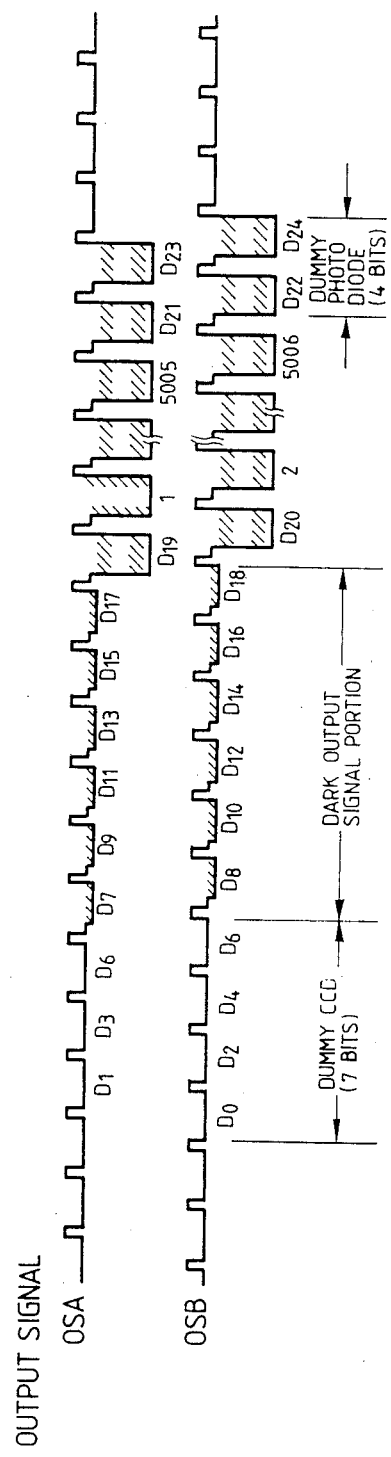
FIG. 5 PRIOR ART

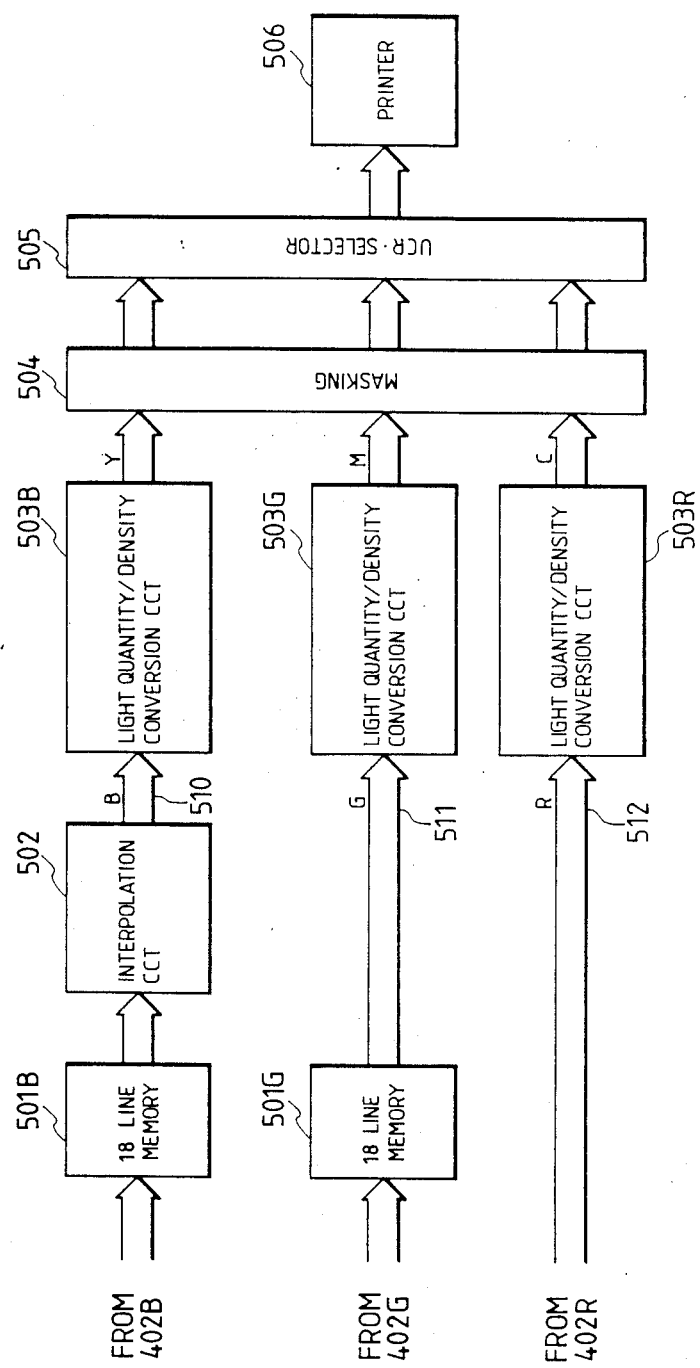

COLOR IMAGER HAVING VARYING FILTER APERTURE SIZES TO COMPENSATE FOR LUMINANCE DIFFERENCES BETWEEN COLORS

BACKGROUND OF THE INVENTION

1. Field of the Invention

The present invention relates to a color image reading apparatus for reading a color image.

2. Related Background Art

Conventional image sensors are classified into silicon crystal type sensors (e.g., CCD's and bipolar sensors) and thin-film sensors (e.g., Cds and amorphous silicon sensors). These image sensors can also be classified into reduction and one-to-one sensors in view of their differing optical arrangements. Color separation schemes of conventional color image reading apparatuses are classified into schemes for switching light sources or color filters using a single image sensor, and schemes without switching, i.e., simultaneous reading and color separation.

Typical simultaneous reading and color separation schemes are a scheme for time-divisionally reading out color separation signals through stripe filters constituting a one-line image sensor in accordance with a dot sequence, and a scheme for reading out color separation signals by a plurality of parallel image sensors in units of separation colors in accordance with a line sequence. A thin-film image reading apparatus is suitable for a high-speed image reading apparatus due to a high reading speed, and a one-to-one image reading apparatus is suitable for a high-sensitivity image reading apparatus due to a wide light receiving area if the read resolution remains the same.

A high-sensitivity image reading apparatus is required especially for a color image reading apparatus in view of a decrease in incident light quantity due to the color separation filters, and the spectral sensitivity characteristics of the image sensor itself. In order to realize high-speed reading by using a light source having a light quantity within a practical range, stripe filters are used for a one-to-one silicon crystal image sensor. However, it is very difficult to manufacture a silicon crystal sensor chip which can cover the length (i.e., 297 mm) of an A4 size due to manufacturing limitations. In recent years, as disclosed in U.S. Pat. No. 4,891,690, assigned in common with the present invention, a plurality of image sensors are arranged in a specific layout to constitute a one-line sensor as a high-speed sensor.

When a plurality of image sensors are connected in a main scanning direction, e.g., a color separation stripe filter of blue (B), green (G), and red (R) is arranged with a read resolution of 16 dots/mm, an interval between the adjacent pixels is 20.8 $\mu$m (=1/16 mm $\times \Delta$). With the above arrangement, it is possible to perform alignment between the respective image sensors, and a high resolution can be obtained without encountering problems concerning positional precision of a read image. However, read density errors between image sensor chips by nonuniformity of the respective image sensors, and particularly color registration errors between image sensor channels in the case of a color reading apparatus pose a serious problem. The causes for density and color registration errors between the image sensor chips are (1) variations in sensitivity and dark current outputs between the image sensor chips, (2) variations in characteristics of chips or signal processors for the respective filters, and the like. As disclosed in U.S. Pat. No. 4,558,357, assigned in common with the present invention, a plurality of image sensors are arranged in a subscanning direction, and R, G, and B color separation filters are coated thereon to provide a plurality of line sensors. By using these line sensors, density and color registration errors between the image sensor chips can be reduced.

In such a reading apparatus, however, sensitivity levels are different in units of colors. The light quantity of a light source is set on the basis of a light receiving element having the lowest sensitivity level. A sensitivity correction filter is inserted for an element of a color having a high sensitivity level, thereby normalizing output levels.

In order to normalize the output levels, a gain of an amplifier for amplifying an output from an element of a color having a low sensitivity level is increased, and a gain of an amplifier for amplifying an output from an element of a color having a high sensitivity level is reduced.

With the arrangement wherein the light quantity of the light source is determined on the basis of the low-sensitivity element, the light output of the light source is wasted for the element having a high sensitivity level, and power is also wasted. In addition, the power required for an original illumination lamp is increased, thus posing a problem concerning temperature rise in the apparatus.

With the arrangement wherein the gain of the amplifier is changed in accordance with output levels of elements, the output level of an element of a color having a low sensitivity level is low, and a high S/N ratio cannot be obtained. As a result, a high-quality signal cannot be obtained.

In a system including a plurality of parallel image sensors to read out color separation signals in accordance with a line sequence or in a system including a silicon crystal stripe filter to read out color separation signals in accordance with a dot sequence, output ratios of the respective filters are greatly different from each other according to total spectral sensitivity characteristics (FIG. 4) of a color reading unit due to the following reasons:

(1) Decreases in incident light quantities by color separation filters, and especially, imbalance of transmittances of the respective color separation filters; and (2) There is no light source having a smooth spectral energy distribution in a necessary wavelength region.

For example, when a color CCD having a spectral sensitivity distribution shown in FIG. 2 is combined with a halogen lamp having a spectral distribution characteristics shown in FIG. 3, the output ratios of the filters are greatly different from each other, as described above. When signal processing shown in FIG. 1 is performed using these output values, S/N ratios are different from each other in units of colors. When color correction such as masking is finally performed, image quality is undesirably degraded.

In order to correct this, there may be proposed a scheme wherein a specific light source such as a bluish white color (BW) fluorescent tube having a high output level at shorter wavelengths and a low output level at longer wavelengths is used to obtain a relative output ratio of 1:1:1, as shown in FIG. 6. However, the spectral distribution characteristics of the light source must be redesigned according to the specifications of the sensor, thus resulting in complex design and high cost. FIG. 7 shows spectral distribution characteristics of th bluish white (BW) fluorescent tube.

Referring to FIG. 1, a 3-line full-color line sensor 100 includes a B-CCD 101 having a blue (B) filter, a G-CCD 102 having a green (G) filter, and an R-CCD 103 having a red (R) filter. These filters are formed on a single wafer. Signal processors 701, 702, and 703 amplify output signals from the CCDs 101, 102, and 103 to voltage levels corresponding to reference levels of A/D converters 704, 705, and 706, respectively. The signal processors 702 and 703 have the same arrangement as that of the signal processor 701, and a detailed illustration thereof is omitted.

Referring to FIG. 1, the signal processor 701 includes a first amplifier 701a, a second amplifier 701b, an S/H circuit 701c, and a comparator 701d. The S/H circuit 701c samples and holds an output level of a dark output signal section which shields the light receiving section with aluminum and receives a dark current component of output signals from the CCD shown in FIG. 5. The comparator 701d compares the dark output signal level with the reference level. The second amplifier 701b, the S/H circuit 701c, and the comparator 701d constitute a feedback clamp circuit for maintaining the reference level of an amplified output signal from each CCD constant. The first and second amplifiers 701a and 701b amplify each CCD output signal to a dynamic range of the A/D converter 704. The output signal ratios of the respective B-CCD 101, G-CCD 102, and R-CCD 103 are different from each other. If the output values of the B-CCD 101, the G-CCD 102, and R-CCD 103 are given as 200 mV, 400 mV, and 600 mV, and the dynamic range of each A/D converter 704, 705, or 706 is given as 2 V, the total gains of the respective signal processors are given as 10 (=2 V/200 mV) for B, 5 (=2 V/400 mV) for G, and 3.3 ($\approx$2 V/600 mV) for R. Since noise levels from the respective CCD are equal to each other, noise levels of the B and G components with respect to the R signal are given as 3 ($\approx$10/3.3) for B and 2 (=10/5) for G. In this manner, the S/N ratios are relatively decreased.

SUMMARY OF THE INVENTION

The present invention has been made in consideration of the above situation, and has as its object to provide a color image reading apparatus having a good color balance.

It is another object of the present invention to provide a color image reading apparatus including a plurality of line sensors having different color filters and capable of optimally reading a color image.

According to one aspect of the present invention to provide a color image reading apparatus wherein an opening area of a light receiving element having a low sensitivity level is increased to obtain an image signal having a high S/N ratio by a small light quantity, mismatching of a resolution of the above element having an increased opening area and resolutions of other light receiving elements is reduced, and a high-quality image can be obtained with a low illuminance.

According to another aspect of the present invention is provided a color image reading apparatus having a plurality of line sensors having different color filters to output signals from the plurality of line sensors in units of color separation colors, wherein gains of output amplifiers arranged at output sections of the respective line sensors are set to be different from each other in units of separation colors, thereby always obtaining an optimal color output.

It is still another object of the present invention is provided a color image reading apparatus wherein a signal storage time of a read sensor having the lowest sensitivity level in the plurality of read sensors having different filters for reading color original information is increased, and output data therefrom is corrected.

The above and other objects, features, and advantages of the present invention will be apparent from the following detailed description taken in conjunction with the accompanying drawings.

BRIEF DESCRIPTION OF THE DRAWINGS

FIG. 5 is a timing chart of output signals;

FIG. 32 is a block diagram of an image processing circuit for recording a color image;

DETAILED DESCRIPTION OF THE PREFERRED EMBODIMENTS

Preferred embodiments of the present invention will be described with reference to the accompanying drawings.

Figure 1:
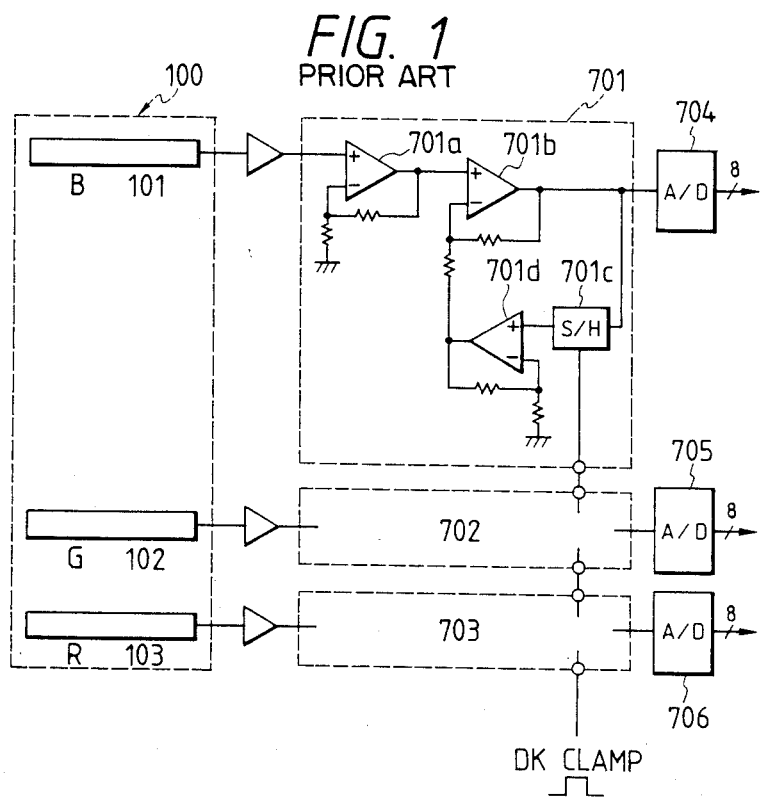
FIG. 1 is a diagram showing a signal processing circuit.
Figure 2:
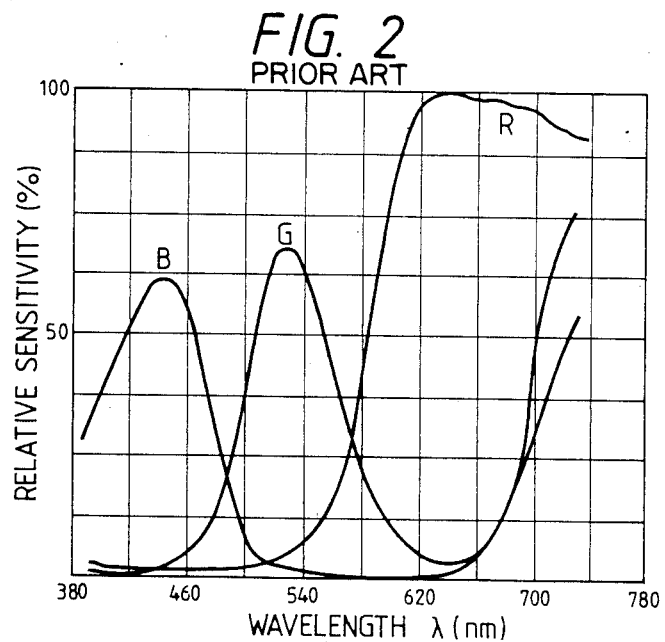
FIG. 2 is a graph showing a spectral sensitivity distribution of a conventional color CCD.
Figure 3:
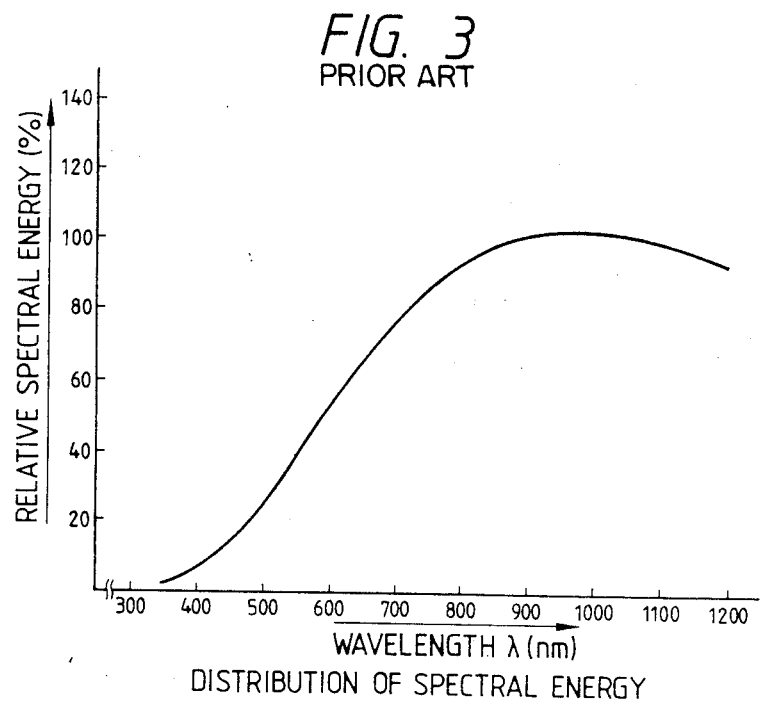
FIG. 3 is a graph showing a spectral sensitivity distribution of a halogen lamp.
Figure 4:
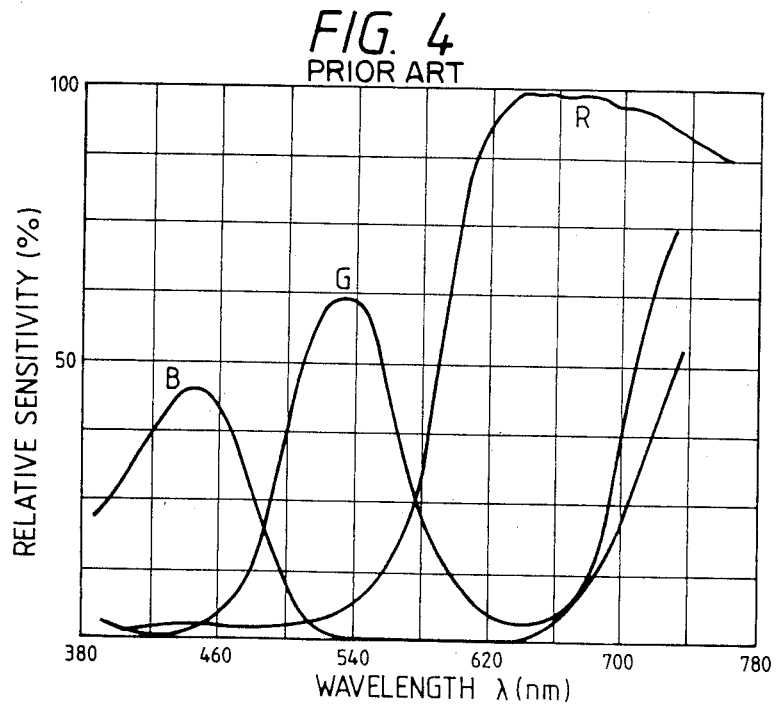
FIG. 4 is a graph showing total distribution sensitivity characteristics.
Figure 6:
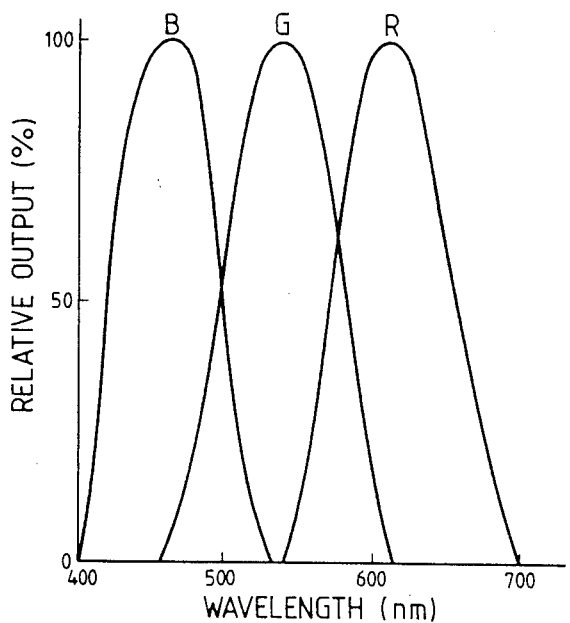
FIG. 6 is a graph showing corrected total distribution sensitivity characteristics.
Figure 7:
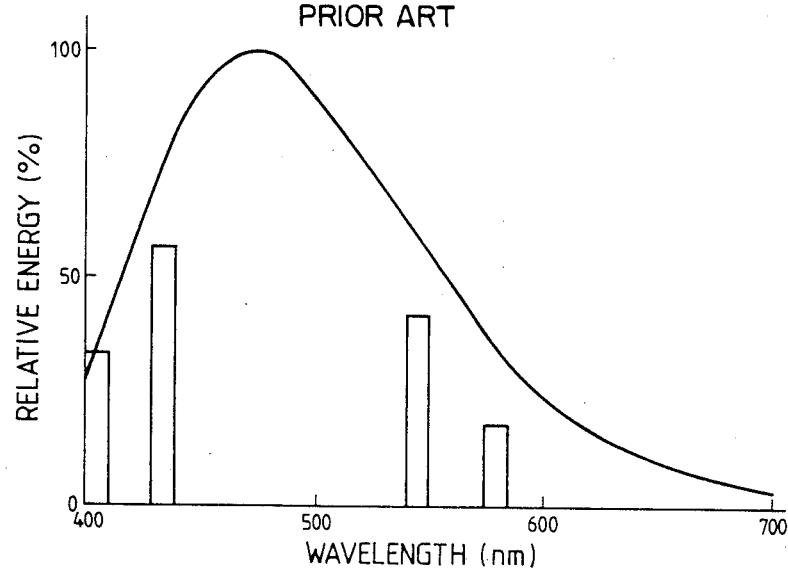
FIG. 7 is a graph showing spectral distribution characteristics of a fluorescent tube.
Figure 8:
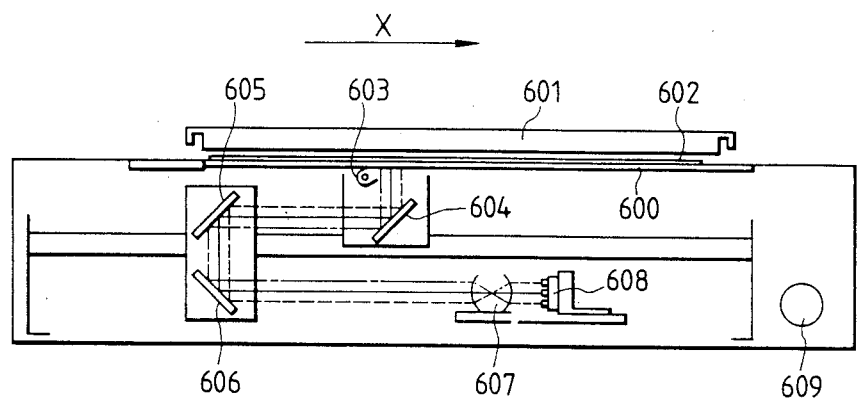
FIG. 8 is a sectional view of an original reading apparatus.

FIG. 8 is a sectional view of an image reading apparatus according to a first embodiment of the present invention. The original reading apparatus includes an original table 600, an original holder 601, an original illumination halogen lamp 603, mirrors 604 to 606, a focusing lens 607, an image reading image sensor 608, and an optical system drive motor 609. An original 602 is placed on the original table 600 made of a transparent glass plate. A first optical system consisting of the halogen lamp 603 and the mirror 604 and a second optical system consisting of the mirrors 605 and 606 are driven in the X direction to sequentially scan the original 602 in the X direction. The original image is sequentially formed on the image sensor 608.

Figure 9A:
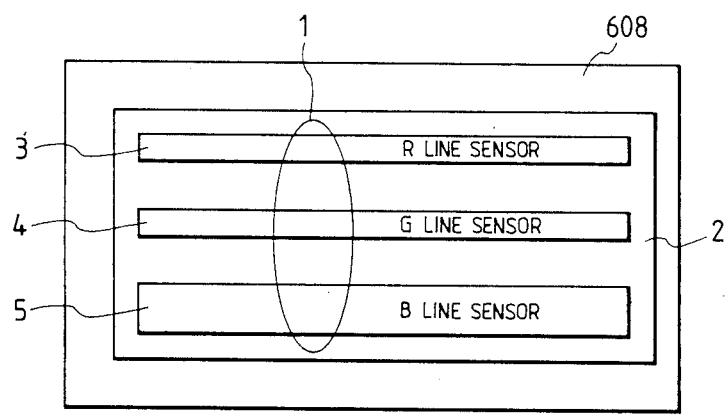
FIGS. 9(A) and 9(B) are graphs showing characteristics of an image sensor.
Figure 9B:
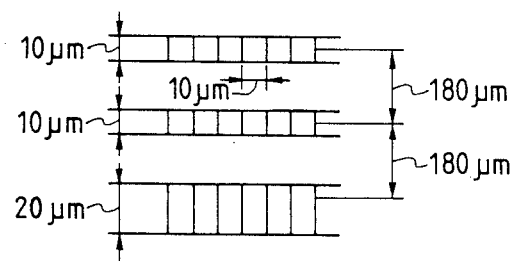

The image reading image sensor 608 will be described with reference to FIG. 9. Referring to FIG. 9(A), the image sensor comprises a CCD chip 2 on which independent line sensor CCDs 3, 4, and 5 are formed. A best illustrated in the enlarged view (FIG. 9(B)) of part of FIG. 9(A), each CCD is arranged such that a plurality of light receiving elements are arranged in a line so as to obtain a pixel pitch of 10 μm and the number of effective pixels of 5,000. An interval between the adjacent CCDs is 180 μm. When the image sensor 608 is arranged as shown in FIG. 8, each line of the original image is scanned by the CCD 3 having the R filter and then by the CCD 4 and the CCD 5.

A red (R) filter is formed on the CCD 3, and a green (G) filter is formed on the CCD 4. A blue (B) filter is formed on the CCD 5.

Figure 10:
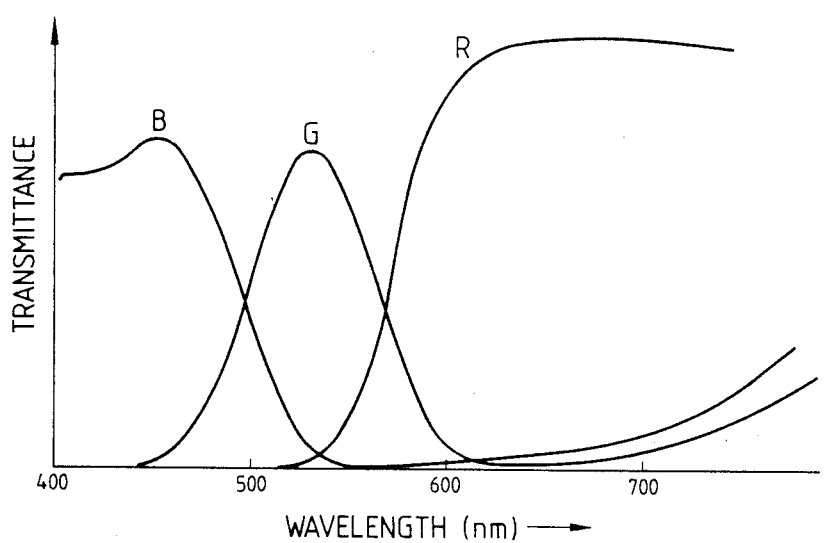
FIG. 10 is a graph showing characteristics of a filter.
Figure 11:
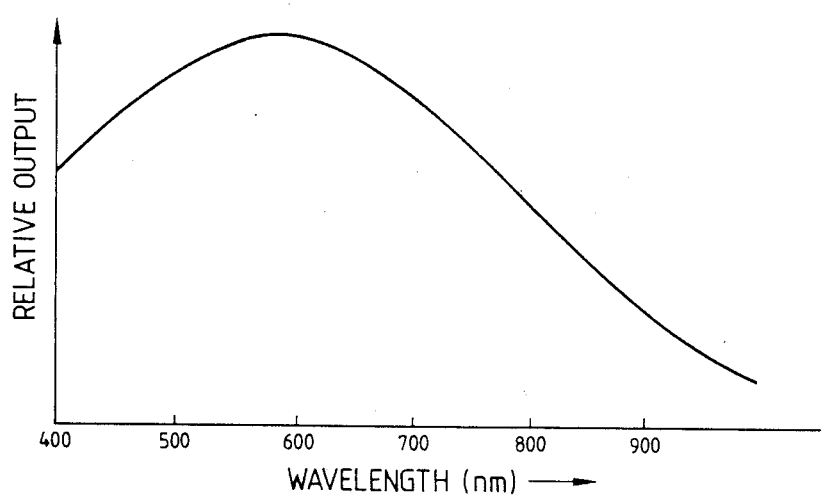
FIG. 11 is a graph showing spectral sensitivity characteristics of a CCD.

FIG. 10 shows spectral distributions of the respective color filters. FIG. 11 shows spectral sensitivity characteristics of CCD without filters, and FIG. 12 shows the spectral distribution of the halogen lamp 603.

As shown in FIG. 10, the respective color separation filters of the image sensor 608 have high transmittances in a wavelength range exceeding a wavelength of 700 nm. These filters have high spectral transmittances for nonvisible light components, i.e., near-infrared and infrared rays which are not associated with visual identification of colors of the image with a human eye. As shown in FIG. 11, the image sensor 608 has a certain sensitivity level up to a wavelength of about 1,000 nm. Therefore, it is apparent that the image sensor 608 has a considerably high sensitivity level for nonvisible near-infrared and infrared rays.

Figure 12:
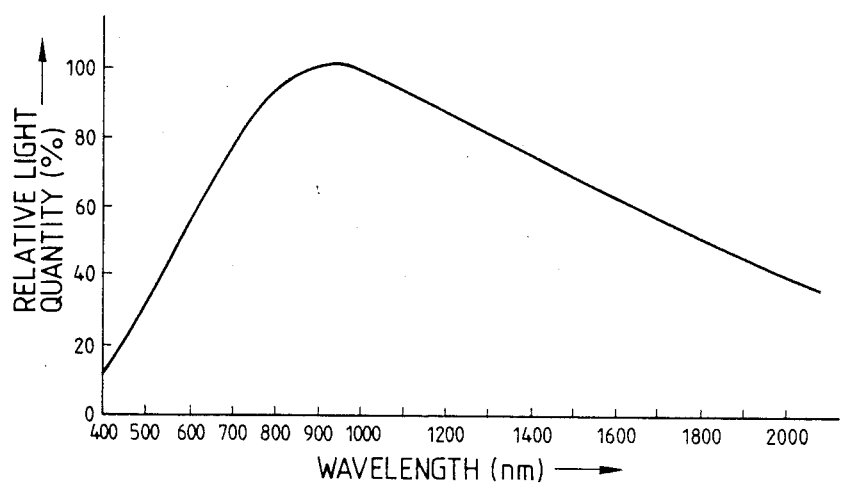
FIG. 12 is a graph showing a spectral distribution of a halogen lamp.

The halogen lamp 603 used as an original exposure light source emits large quantities of near-infrared and infrared rays, as shown in FIG. 12.

The image sensor 608 responds to the near-infrared and infrared rays and generates noise.

In the image reading apparatus shown in FIG. 8, a near-infrared cut filter (not shown) and an infrared cut filter (not shown) are inserted in an optical path (e.g., inside or near the lens 607) from the original to the image sensor 608. Therefore, color noise generated by the near-infrared and infrared external light components can be prevented.

Figure 13:
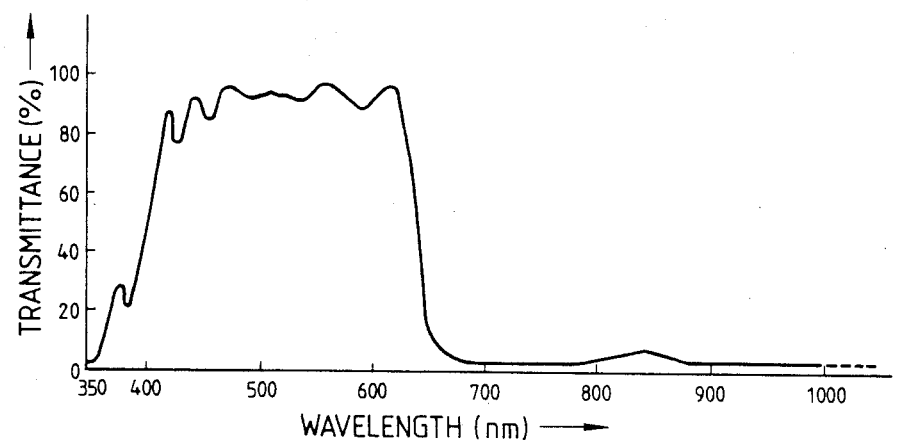
FIG. 13 is a graph showing transmittance of a near-infrared cut filter.
Figure 14:
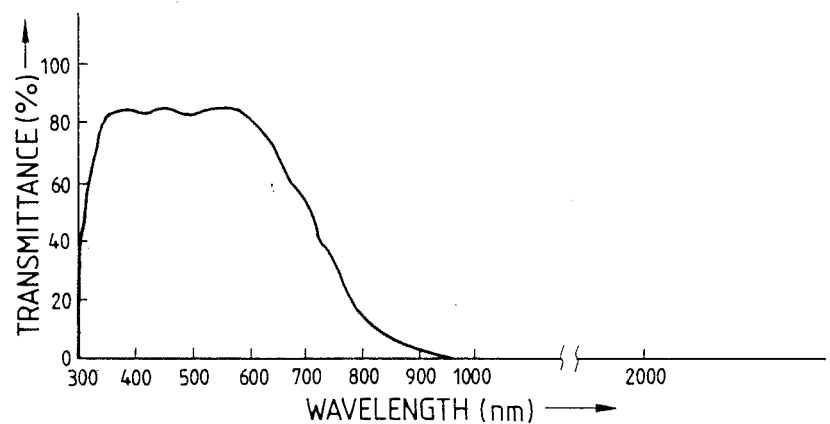
FIG. 14 is a graph showing transmittance of an infrared cut filter.

FIG. 13 shows the transmittance of the near-infrared cut filter, and FIG. 14 shows the transmittance of the infrared cut filter.

A product of the spectral distribution of the halogen lamp 603, the characteristics of the near-infrared cut filter, the characteristics of the infrared cut filter, the characteristics of the color filters, and the CCD spectral distributions is calculated to obtain outputs of the respective colors from the image sensor 608.

Figure 15:
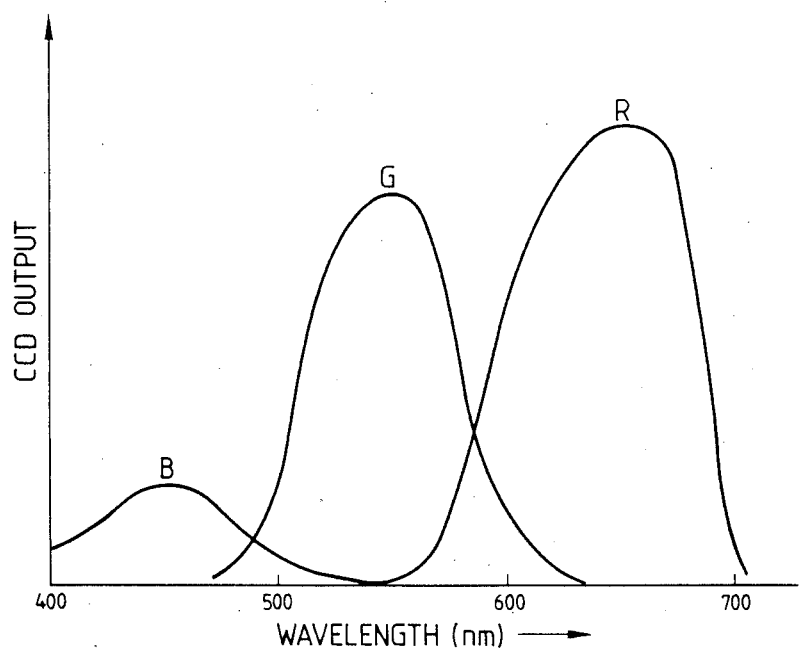
FIG. 15 is a graph showing total sensitivity characteristics.

Total sensitivity characteristics are shown in FIG. 15.

A sensitivity ratio of R:G:B is 5:4:1; the blue sensitivity level is lower than the red and green sensitivity levels.

In the arrangement of FIG. 8, the three CCDs 3, 4, and 5 scan image lines of different positions during a given time. However, the three CCDs 3, 4, and 5 may simultaneously scan the same line with an optical arrangement of a mirror, a lens, and the like.

Figure 16:
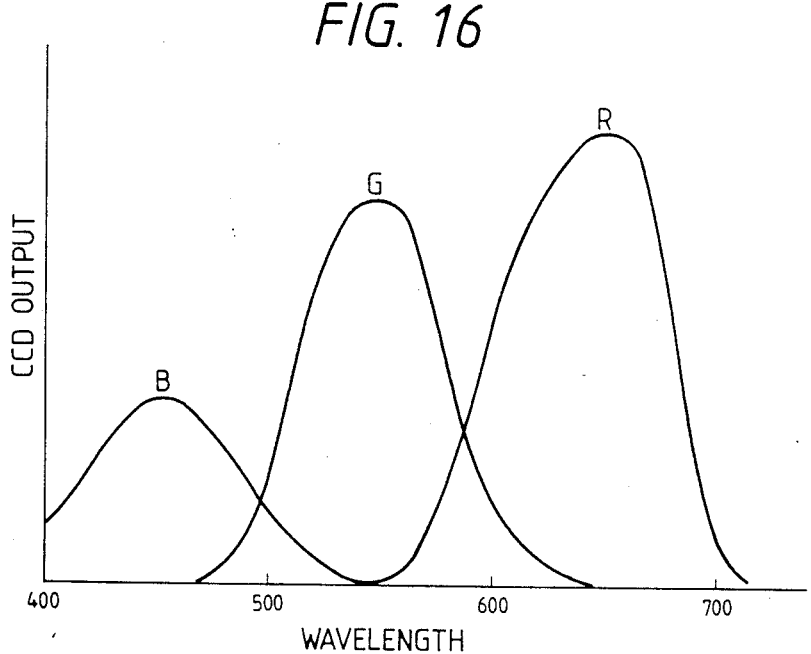
FIG. 16 is a graph showing total sensitivity characteristics of a first embodiment.

In this embodiment, as shown in FIG. 9, the opening size of the B-CCD 5 is set to twice that of the R- or G-CCD 3 or 4 in the subscanning direction. In this case, a sensitivity ratio of R:G:B is set to be 5:4:2, as shown in FIG. 16. ND filters (not shown) are inserted for the R and G components, and an output ratio of R:G:B is set to be 2.5:2:2.

Figure 17A:
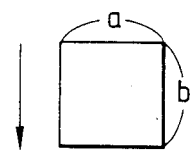
Figs. 17(A) TO 17(D) are views for explaining blur.
Figure 17B:
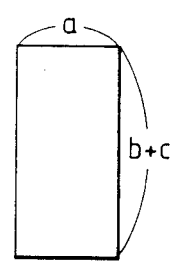
Figure 17C:
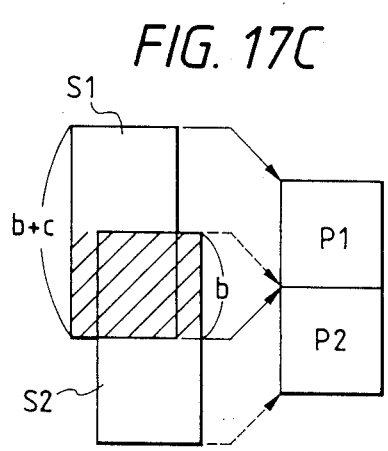

As shown in FIG. 17(A), one pixel of each CCD has predetermined lengths represented by a and b in the main scanning and subscanning directions, respectively. When the CCD having the length b in the subscanning direction is moved by C in the subscanning direction to read an image of one pixel, an area of a x (b +c) of the original is read as one pixel, as shown in FIG. 17(B). When a displacement c in the subscanning direction is defined as a scanning length in one-to-one reading, an image read in an original area S1 on a given scanning line is recorded as a pixel P1 at a printer, as shown in FIG. 17(C). An image read in an original area S2 by the same pixel on the next scanning line is recorded as a pixel P2 at the printer. Therefore, a portion corresponding to the opening area of the CCD which is indicated by a hatched area is commonly included as a blur component in both the pixels P1 and P2.

The degree of blur per pixel of the recorded image is given as b/(b+c). Therefore, if the opening area of the CCD is doubled in the subscanning direction, i.e., if b=2a and c=a are given, the degree of blur is increased to 4/3 times.

Figure 18:
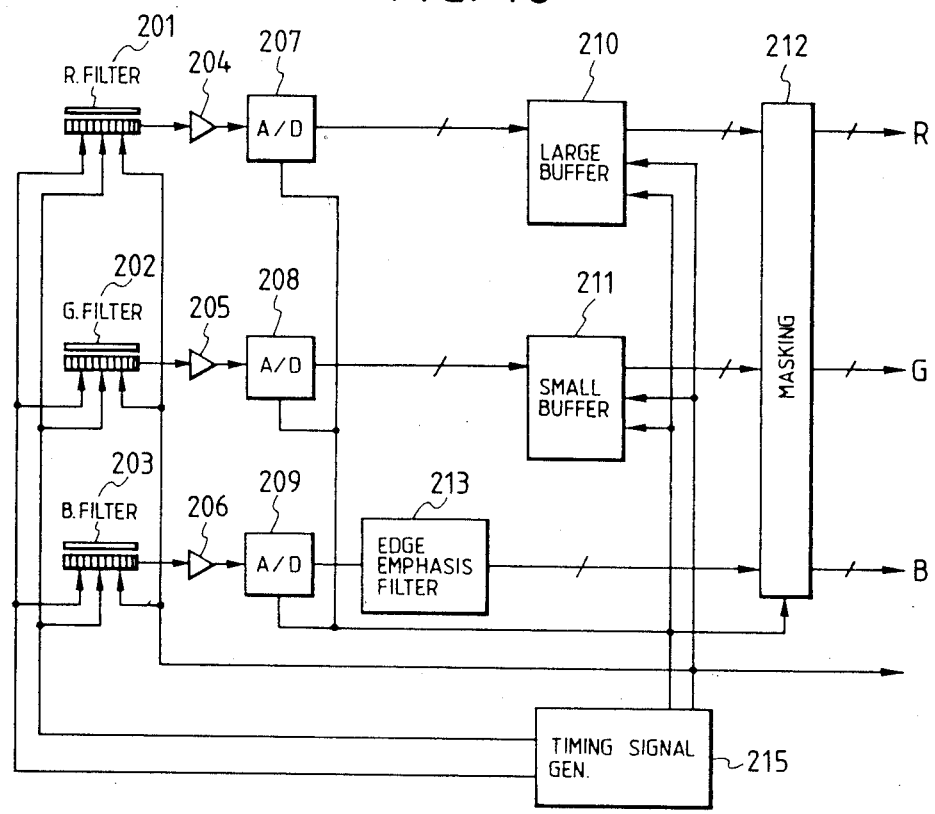
FIG. 18 is a circuit diagram of a signal processing circuit of the first embodiment.

Processing of the read signals will be described with reference to FIG. 18. R, G, and B CCD line sensors 201, 202, and 203 are driven at the same phase in response to an output from a timing signal generator 215. Outputs from the CCD line sensors 201, 202, and 203 are amplified by amplifiers 204, 205, and 206, respectively. The amplifiers 204 to 206 have gains for output analog signals from the line sensors so as to perform sensitivity matching of the R, G, and B components and signal processing. An output signal from the CCD has a voltage of about 0.2 V and is amplified by about 10 times to obtain a voltage of 2 V. The amplified signal is converted by an A/D converter into 8-bit digital data.

As shown in FIG. 9, the R, G, and B CCD sensors are spaced apart from each other at intervals of 180 μm in the subscanning direction. Since the pixel read pitch is given as 10 μm, an 18-line delay occurs.

The output signal from the R CCD line sensor 201 is stored in and delayed by a large buffer 210 consisting of a 36-line memory. The output signal from the G CCD line sensor 202 is stored in and delayed by a small buffer 211 consisting of an 18-line memory. The delayed signals are supplied to a masking circuit 212 and are subjected to color correction processing. The output signal from the B CCD line sensor 203 is supplied to a means for correcting blur, i.e., an edge emphasis filter 213 since the opening width of the B-CCD is larger than that of the CCD 201 or 202 as described above.

Figure 19:
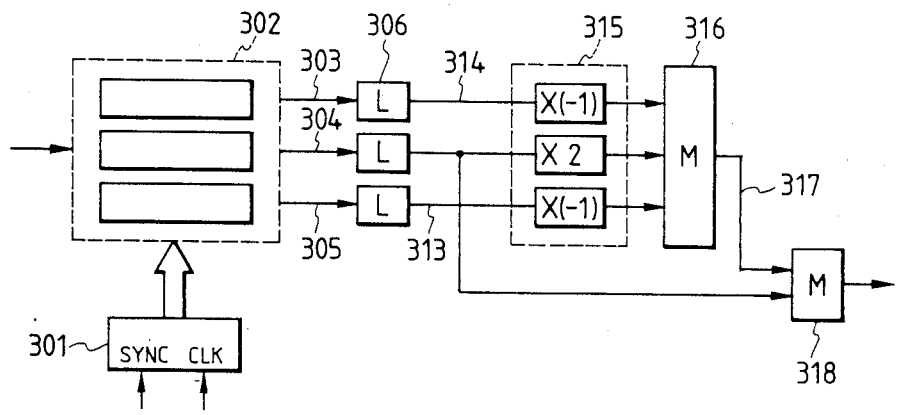
FIG. 19 is a block diagram of an edge emphasis filter.

The edge emphasis filter 213 comprises a Laplacian filter of a 3-line delay buffer, as shown in FIG. 19. The edge emphasis filter 213 performs secondary differentiation in the subscanning direction, thereby emphasizing the edge of the image. That is, three line image signals, i.e., an image signal 303 of the current line, an image signal 304 of the first preceding line, and an image signal 305 of the second preceding line, are output from the 3-line delay buffer memory addressed by an output from an address counter 301 for identifying one-line pixels. These image signals are delayed in units of pixels by a latch 306.

Pixel signals 313 and 314 which are the immediately preceding and succeeding signals of a pixel of interest in the main scanning direction are multiplied by, e.g., (−1) by a multiplier 315, and the product is added to twice the signal 307 of the pixel of interest to obtain a secondary differential signal 317 of the pixel of interest along the subscanning direction.

The secondary differential signal 317 is added to the signal of the pixel of interest by an adder 318 to obtain an edge-emphasized image signal. That is, a signal free from blur can be obtained. The magnitude of actual edge emphasis, i.e., a parameter of the multiplier 315 is determined in accordance with the width of the opening.

The edge-emphasized signal is supplied together with the output signals from the buffers 210 and 211 to the masking circuit 212 (FIG. 18) to eliminate an undesirable color mixture caused by the filter characteristics. Therefore, data of the respective colors to be recorded at a printer can be extracted by an UCR.selector.

In the embodiment, the opening widths of the sensors are different from each other in the subscanning direction. However, the same processing as described above can also be used for processing in the main scanning direction.

Figure 20:
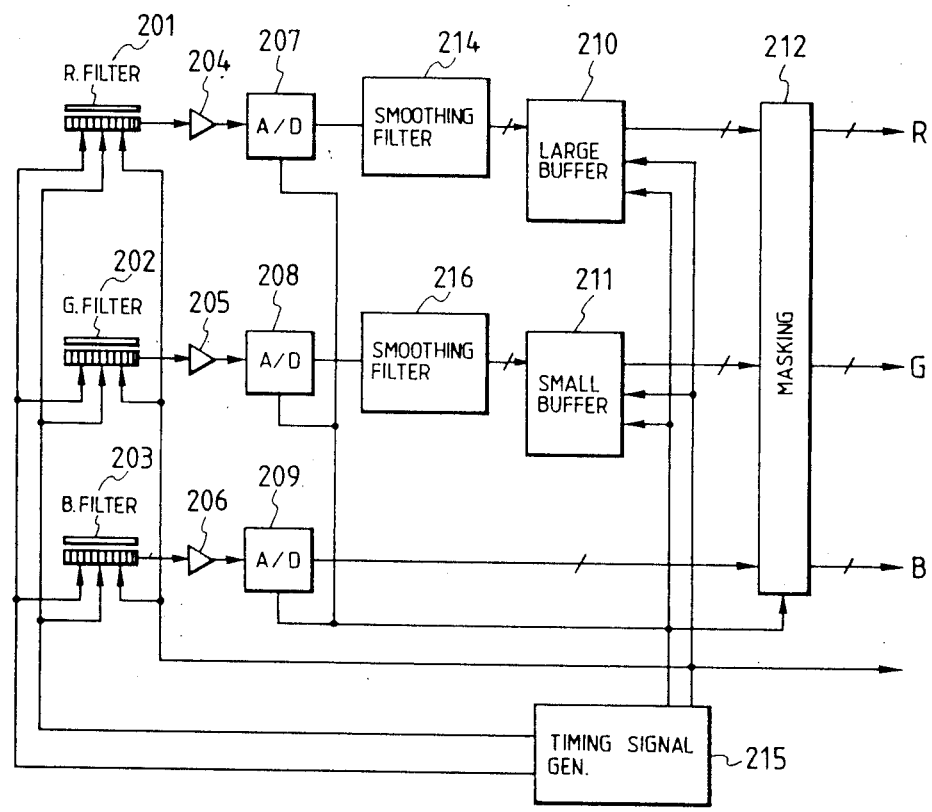
FIG. 20 is a diagram for explaining a second embodiment.

In the above embodiment, blur caused by an increase in opening size of the blue CCD is reduced by edge emphasis. However, the red and green signals may be smoothed to obtain a blur effect having the same level as that of the blue component. More specifically, as shown in FIG. 20, smoothing filters 214 and 216 each comprising a 3-line delay buffer are inserted in the R and G signal lines. The image signals of the immediately preceding and succeeding lines of the pixel of interest along the main scanning direction are multiplied with, e.g., ¼, by a multiplier and are added to a product which is ½ times the signal of the pixel of interest. Therefore, a signal smoothed along the subscanning direction with respect to the pixel of interest can be obtained. These signals are supplied to the masking circuit 212, and data of the respective colors to be recorded at a printer can be extracted through a UCR.selector. The same reference numerals as in FIG. 18 denote the same parts in FIG. 20.

Figure 21:
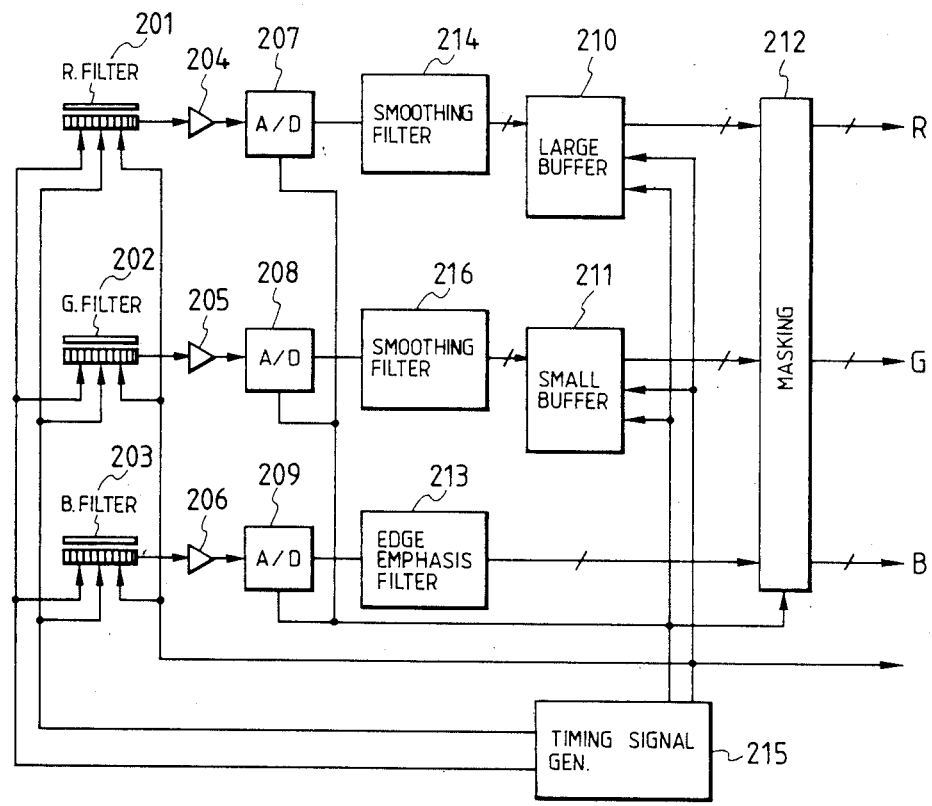
FIG. 21 is a diagram for explaining a third embodiment.

Smoothing filters 214 and 216 are inserted for red and green signals, respectively, as shown in FIG. 21. An edge emphasis circuit 213 is inserted for the blue signal from the blue CCD having a large opening area. In this case, the red and green signals are smoothed, and blur is eliminated from the blue signal, thereby obtaining substantially identical resolutions and hence reducing color misregistration. The same reference numerals as in FIGS. 18 and 20 denote the same parts in FIG. 21.

Figure 17D:
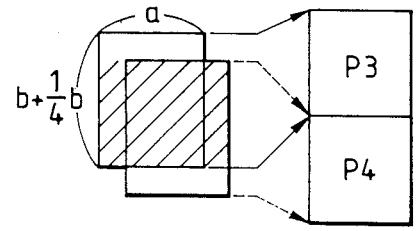

It is also effective to obtain a high-quality image by changing a magnitude of edge emphasis in accordance with a magnification in the subscanning direction. As shown in FIG. 17(A), if the opening widths of the CCD in the main scanning and subscanning directions are defined as a and b, and a displacement for reading an original along the subscanning direction is defined as c, the degree of blur per pixel of the record image is given as $b/(b+c)$, as previously described. When the degree of blur at a recording magnification of 100% along the subscanning direction is compared with that of 400% (FIG. 17(D)), the degree of blur at a magnification of 400% is $c = \frac{1}{4}b$ if the displacement at a magnification of 100% is $c = b$. Therefore, the degree of blur at a magnification of 400% is 8/5 times that at a magnification of 100%.

Figure 22:
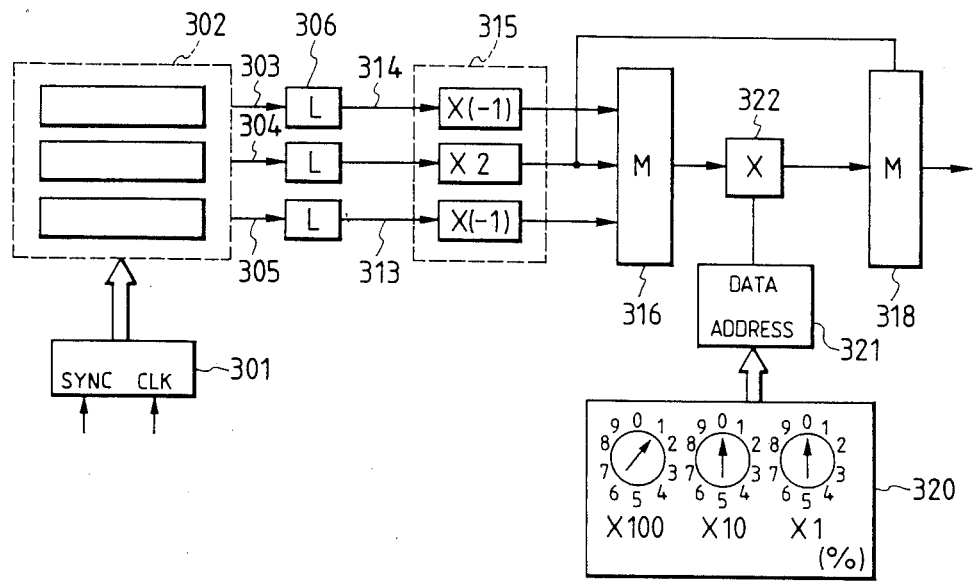
FIG. 22 is a diagram showing an arrangement of the edge emphasis circuit.
Figure 23:
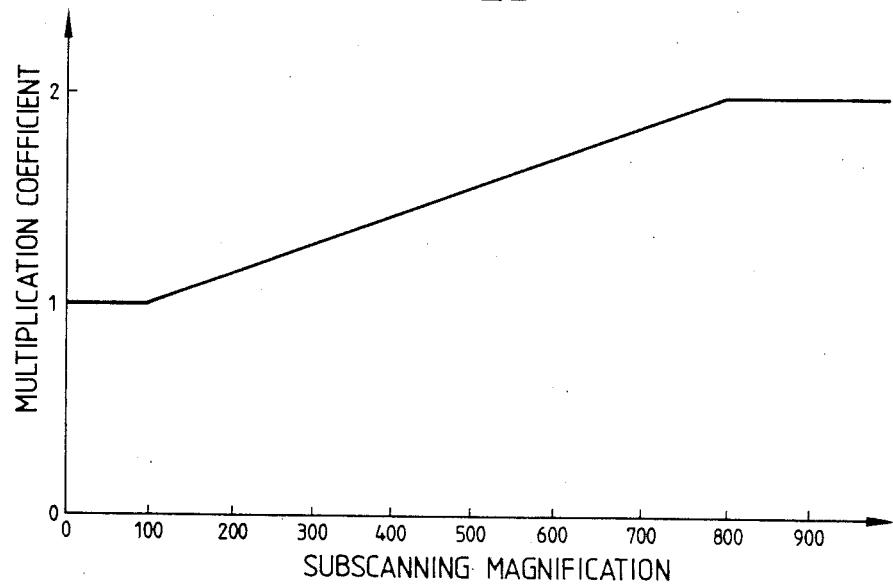
FIG. 23 is a graph showing the multiplication coefficient for edge emphasis as a function of the subscanning magnification.

As shown in FIG. 22, there is provided a memory table 321 for receiving as an address signal an output from a rotary switch 320 which sets the subscanning magnification in % and for outputting a corresponding subscanning edge emphasis signal multiplication coefficient. For example, multiplication coefficients for 100% and 800% magnifications are given as 1 and 2, respectively, and plots for the 100% and 800% magnifications are connected by a line to determine the magnification coefficients from 100% to 800%.

In the above embodiment, the R, G, and B sensors are exemplified. However, the same operations can be applied if other color filters are used.

As described above, an insufficient sensitivity can be compensated by increasing the opening area, and therefore, a high-quality video signal having a high S/N ratio can be obtained with a low illuminance. Resolution mismatching caused by an increase in opening area can be prevented by using filters having different frequency characteristics, thereby obtaining a high-quality video signal.

In some arrangements as has been described above, the opening of the light receiving section of the B-CCD is set to be larger than that of other CCDs in order to correct an output level of the B-CCD. However, the above countermeasure poses another problem of blur.

Another arrangement for correcting the output level of the B-CCD without causing blur will be described below. The arrangement of the image reading apparatus is the same as that of FIG. 8.

Figure 24:
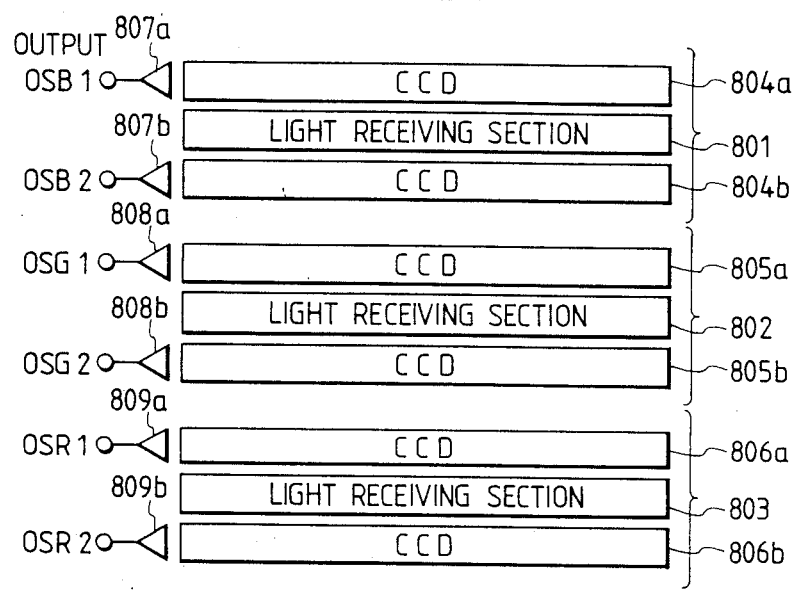
FIG. 24 is a diagram showing another arrangement of an image sensor.

FIG. 24 shows a schematic internal arrangement of an image reading element (image sensor) consisting of a plurality of line sensors having different color filters of this embodiment. Light receiving sections 801, 802, and 803 are formed such that stripe filters of organic dyes, i.e., blue (B), green (G), and red (R) are directly formed on silicon (Si) photo diodes (PDs), respectively. CCD shift registers 804a, 804b, 805a, 805b, 806a, and 806b transfer charges from the B, G, and R light receiving sections 801, 802, and 803 to an output section. The two shift registers 804a and 804b, 805a and 805b, or 806a and 806b are grouped to transfer the charges a right and left charge components in units of pixels. Each of floating diffusion amplifiers (FDAs) 807a, 807b, 808a, 808b, 809a, and 809b includes an output capacitor called a floating diffusion (FD) for detecting a charge from a corresponding one of the light receiving sections 801, 802, and 803 and converting the charge into a voltage, and an amplifier for amplifying the output from the corresponding FD. Note that the right and left charges are detected by each pair of FDAs 807a and 807b, 808a and 808b, or 809a and 809b.

A B-CCD sensor consisting of the light receiving section 801, the CCD shift registers 804a and 804b, and the FDAs 807a and 807b, a G-CCD sensor consisting of the light receiving section 802, the CCD shift registers 805a and 805b, and the FDAs 808a and 808b, and an R-CCD sensor consisting of the light receiving section 803, the CCD shift registers 806a and 806b, and the FDAs 809a and 809b are formed on a single silicon (Si) wafer and can be independently operated.

Figure 25:
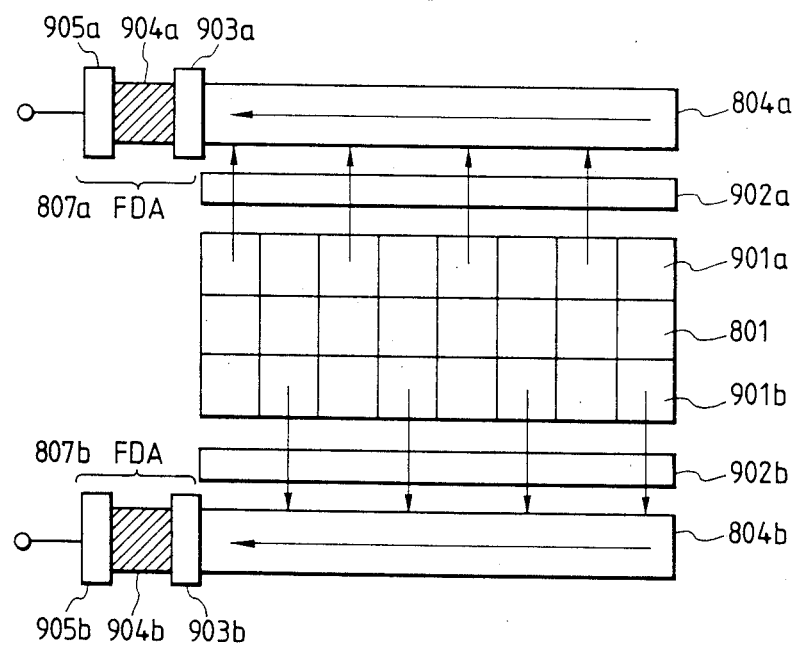
FIG. 25 is a diagram showing an internal arrangement of the image sensor.

FIG. 25 is a view showing a detailed arrangement of the B-CCD in FIG. 24. An operation of the B-CCD will be described below.

The light receiving section 801 consists of a photoelectric conversion section 801a and storage sections 901a and 901b. The charges stored in the light receiving section 801 are transferred to the CCD shift registers 804a and 804b in response to shift gate pulses $\phi$SG applied to shift gates 902a and 902b, respectively.

In this case, the charges stored in the even-numbered pixels are transferred to the even-numbered CCD shift register 804b, and the charges stored in the odd-numbered pixels are transferred to the odd-numbered CCD shift register 804a.

The period of the shift gate pulse $\phi$SG corresponds to the storage time.

The CCD shift registers 804a and 804b transfer the charges from the light receiving section 801 to the output FDAs 807a and 807b in response to two-phase clocks $\phi$1 and $\phi$2.

The FDAs 807a and 807b comprise output gates (ODs) 903a and 903b, output capacitors 904a and 904b, and amplifiers 905a and 905b, respectively. The charges are supplied from the CCD shift registers 804a and 804b to the capacitors 904a and 904b. The charges transferred through the output gates 903a and 903b are voltages corresponding to the charges. The voltages are impedance-converted by two-stage source follower amplifiers 905a and 905b and are output.

Figure 26:
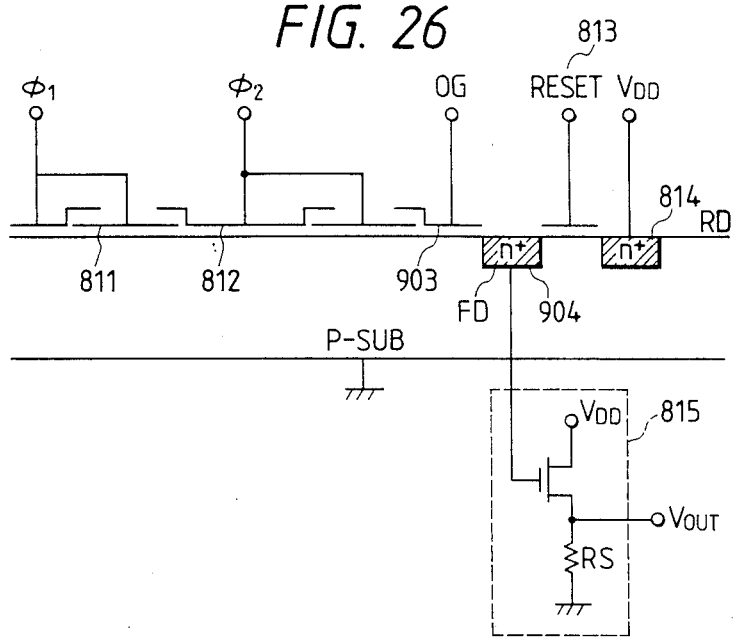
FIG. 26 is a circuit diagram of an output section.

The FDAs 807a and 807b will be described in detail with reference to FIG. 26. For illustrative convenience, the amplifier 905 is represented by a one-stage source follower amplifier.

The clocks $\phi$1 and $\phi$2 are input to clock electrodes 811 and 812, respectively. The electrode 812 serves as an electrode of the output gate 903, the operation of which is apparent from the above description. Pulses are periodically applied to a reset electrode 813 to reset the output capacitor (FD) 904 to be a voltage VDD of a reset drain 814. The output capacitor (FD) 904 is separated from the reset drain (RD) 814 until a charge is injected into the output capacitor (FD) 904.

A signal output $\Delta V$ can be defined as follows:

$$\Delta V = Au \cdot \Delta Vv = (QS/CFD) \cdot (gmRs/(1+gmRs))$$

where Qs is the signal charge supplied to the output capacitor (FD) 904, CFD is the capacitance of the output capacitor (FD) 904, Ar is the voltage gain of the source follower amplifier, and gm is the transfer conductance of an amplifying MOSFET.

In this case, the signal output $\Delta V$ is proportional to the signal charge Qs. In addition, the smaller the capacitance of the output capacitor (FD) 904 becomes, the higher the output voltage becomes.

The capacitances CFD of the output capacitors (FDs) 904 are increased in an order of B-CCD, G-CCD, and R-CCD in an inverse proportion of the sensitivity levels of the B-CCD, G-CCD, R-CCD light receiving sections 801, 802, and 803 thereby decreasing the gains of the output sections. As a result, an output voltage ratio of B-CCD:G-CCD:R-CCD is set to be substantially 1:1:1.

A light source as a general light-measuring light source and a light source using an infrared cut filter for preventing an influence of sensitivity on the CCD long wavelength side are used to determine the output voltage ratio.

The capacitance CFD of the output capacitor (FD) 904 can be adjusted by changing a pattern area of the FD 904. More specifically, when the pattern area is decreased, the output capacitance CFD is decreased. Otherwise, the capacitance CFD is increased.

In this embodiment, the pattern areas of the output capacitors (FDs) 904 are increased in an order of B-CCD, G-CCD, and R-CCD in an inverse proportion of the sensitivity levels, thereby obtaining the above output ratio.

Figure 27:
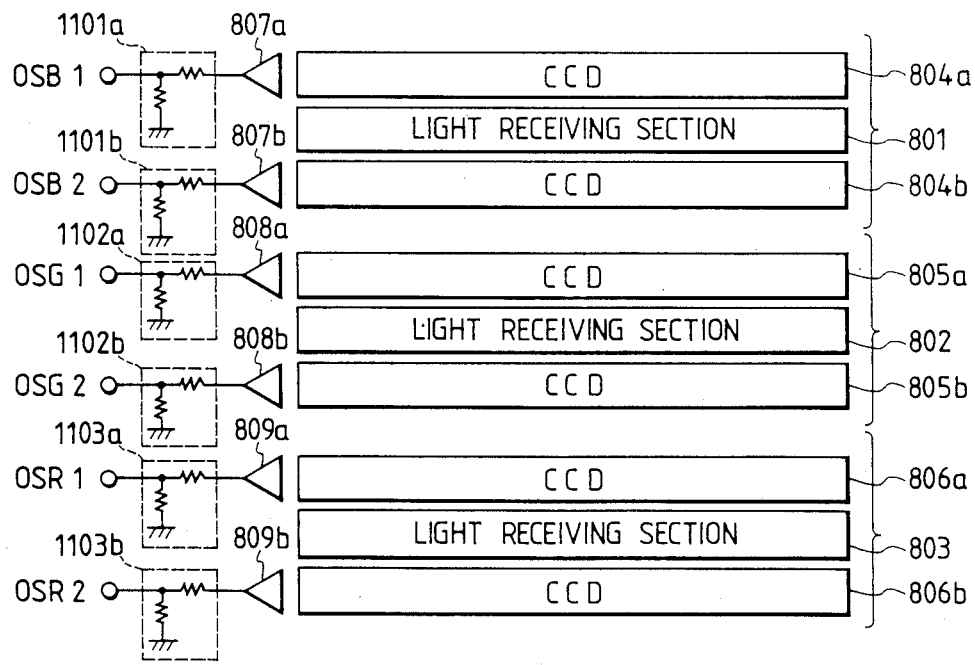
FIG. 27 is a diagram showing an internal arrangement of an image sensor according to a fourth embodiment of the present invention.

FIG. 27 shows still another embodiment of the present invention. In the above embodiment, the capacitances CFD of the output capacitors (FDs) 904 of the FDAs are adjusted in inverse proportion to the sensitivity levels of the light receiving sections 801, 802, and 803 so that the output ratio of B-CCD:G-CCD:R-CCD is set to be 1:1:1. For this purpose, the pattern areas of the output capacitors (FDs) of the FDAs are decreased in an order of R-CCD, G-CCD, and B-CCD.

In the embodiment of FIG. 27, capacitances CFD of output capacitors (FDs) are identical in the B-CCD, the G-CCD, and the R-CCD. Attenuators 807a, 807b, 808a, 808b, 809a, and 809b are connected to the output terminals of the CCD FDAs so that a CCD output ratio is set to be about 1:1:1.

When output values of the B-CCD, the G-CCD, and the R-CCD are given as 200 mV, 400 mV, and 600 mV, respectively, an attenuator ratio of the attenuators 1101a, 1101b, 1102a, 1102b, 1103a and 1103b is determined as follows. An attenuator ratio of the attenuators 1101a and 1101b is 1; that of the attenuators 1102a and 1102b is 0.5; and that of the attenuators 1103a and 1103b is 0.33. With this arrangement, the same effect as in the above embodiment can be obtained.

In the color image pickup element having a plurality of parallel CCDs in units of separation colors, the gains of the output amplifiers of the output sections of the color CCDs are changed in units of separation colors, and the CCD output signal levels are equalized in units of separation colors. Therefore, an imbalance of the output signal levels in units of separation colors can be prevented unlike in the conventional arrangement, and signal states can be uniformed in units of separation colors.

Since the output signal levels are equalized in units of separation colors, identical output signal processing circuits can be used for all colors, thus preventing an increase in cost.

As has been described above, the output level of the line sensor of each color can be set to be an optimal level. For example, line sensor outputs for white can be uniformed, and good color image reading can be performed.

In the above embodiments, the opening size of the light receiving section of the B-CCD or the amplifier gain of the output section of the B-CCD is increased to correct the output levels of the B-CCD.

An arrangement for correcting a B-CCD output level without differentiating the structures of image sensors in three CCDs will be described below.

An arrangement of this embodiment is the same as that described with reference to FIG. 8. However, in this embodiment, an image sensor 408 shown in FIG. 28 is used in place of the image sensor 608.

Figure 28A:
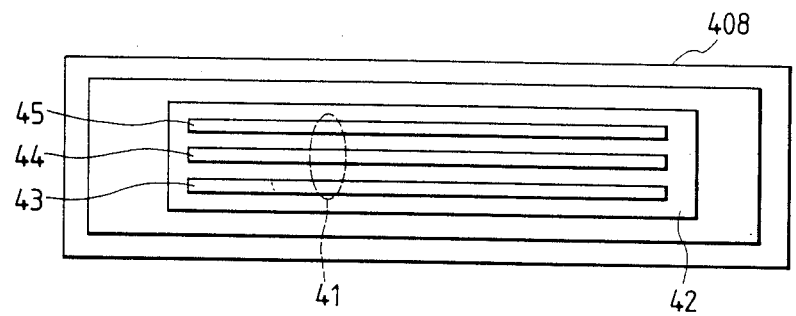
FIGS. 28(A) and 28(B) are views showing still another arrangement of the image sensor.
Figure 28B:
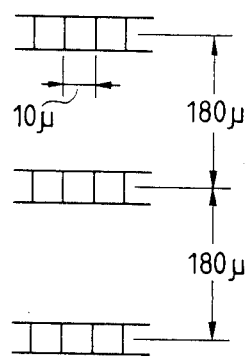

The image reading image sensor 408 will be described with reference to FIGS. 28(A) and 28(B). The image sensor 408 comprises a CCD chip 42. Three independent line sensor CCDs 43, 44, and 45 are formed on the chip 42. As shown in an enlarged view (FIG. 28(B)) of part of FIG. 28(A), a plurality of light receiving elements ar arranged in lines such that a pixel pitch is set to be 10 μm, and the number of effective pixels is 5,000. An interval between the adjacent CCDs is given as 180 μm. When such an image sensor 408 is arranged in the manner as in FIG. 8, the CCD 43 having the G filter scans a given line of an original image first. Thereafter, the CCDs 44 and 45 scan the same line.

The subscanning opening widths of the CCDs 43, 44, and 45 of the image sensor 408 are identical, unlike in the image sensor 608 in FIG. 9.

A red (R) filter is formed on the CCD 43, a green (G) filter is formed on the CCD 44, and the blue (B) filter is formed on the CCD 45.

Figure 29:
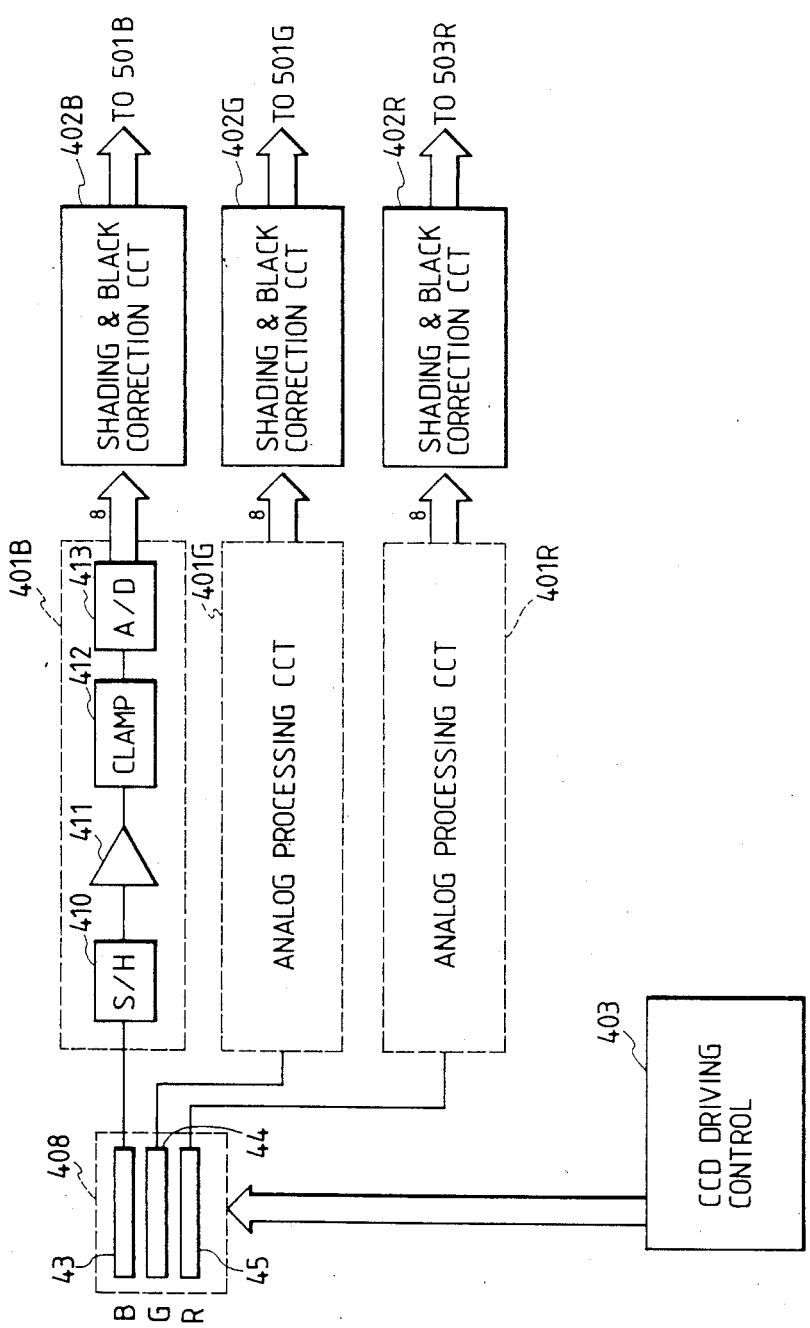
FIG. 29 is a block diagram showing an image sensor driving circuit and an output processing circuit.

FIG. 29 is a block diagram showing driving of the image sensor 408 shown in FIG. 28 and an arrangement of an output processing circuit.

The three CCDs 43, 44, and 45 of the image sensor 408 are driven by drive signals from a CCD driving control 403. Read outputs from the CCDs 43, 44, and 45 are supplied to analog processing circuits 401B, 401G, and 401R, respectively. The B, G, and R analog processing circuits 401B, 401G, and 401R have identical arrangements. Each analog processing circuit comprises a sample/hold (S/H) circuit 410 for sampling and hold an analog signal as a read output, an amplifier 411 for amplifying the analog signal sampled and held by the S/H circuit 410, a clamping circuit 412 for reproducing a black level of the amplified analog signal, and an analog-to-digital (A/D) converter 413 for converting the analog signal into a digital signal.

The color signals as the digital signals output from the analog processing circuits 401B, 401G, and 401R are input to shading & black correction circuits 402B, 402G, and 402R, respectively. Shading correction and black correction of these digital signals are performed by the shading & black correction circuits 402B, 402G, and 402R.

Figure 30:
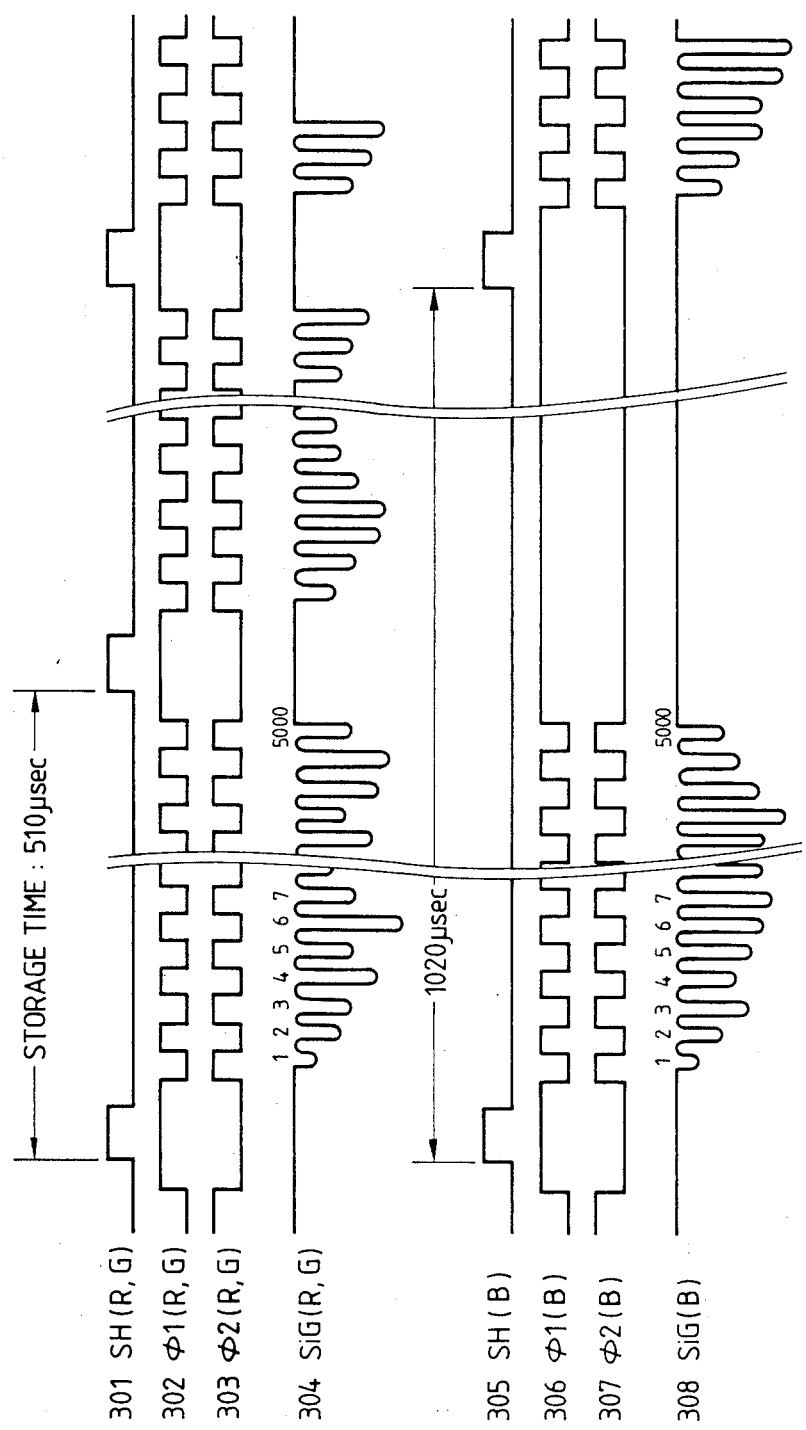
FIG. 30 is a timing chart showing the relationship between image sensor drive signals and its outputs.

FIG. 30 is a timing chart showing the relationship between drive signals supplied from the CCD driving control 403 to the image sensor 408 and outputs from the image sensor 408.

A shift pulse (SH signal) 301 is supplied to the CCD 45 having the R filter and the CCD 44 having the G filter. Transfer clocks 302 and 303 are supplied to the CCDs 45 and 44, respectively. Output signals 304 are generated by the CCDs 45 and 44.

A shift pulse (SH signal) 305 is supplied to the CCD 43 having the B filter, transfer clocks 306 and 307 are supplied to the CCD 43, and an output signal 308 is generated by the CCD 43.

The CCD driving control 403 comprises a clock generator for generating a reference clock serving as a read reference, and a frequency divider for frequency-dividing the reference clock at different frequency division ratios, thereby generating various drive signals.

The SH signals 301 and 305 are shift pulses for transferring to the charge transfer section charges stored in correspondence with an incident light quantity. The interval of the SH signals is a charge storage time of each CCD. When this time is prolonged, a large quantity of charge can be stored, and an output voltage of the corresponding CCD is increased. Signals transferred to the charge transfer section by the SH signals 301 and 305 are transferred to the output section in response to the transfer clocks 302, 303, 306, and 307 and are extracted as the output signals 304 and 308.

As is apparent from FIG. 30, the SH signal 301 is generated every 510 μsec, and therefore, the CCDs 44 and 45 store charges within the charge storage time of 510 μsec. The charge is output at a rate of 100 nsec/pixel.

The SH signal 305 is supplied to the CCD 43 having the B filter every 1.02 msec, and the storage time of the CCD 43 is 1.02 msec. An output is generated by the CCD 43 at a rate of 100 nsec/pixel (the same rate as in the CCDs 43 and 44).

The storage time of the CCD 43 is twice that of the CCD 44 or 45. The CCD 44 or 45 reads a 2-line image while the CCD 43 reads a one-line image. The number of blue outputs from the CCD 43 is ½ that of other CCDs. However, the blue output as an image output has a level twice that of each of the green and red outputs from the CCDs 44 and 45.

Figure 31:
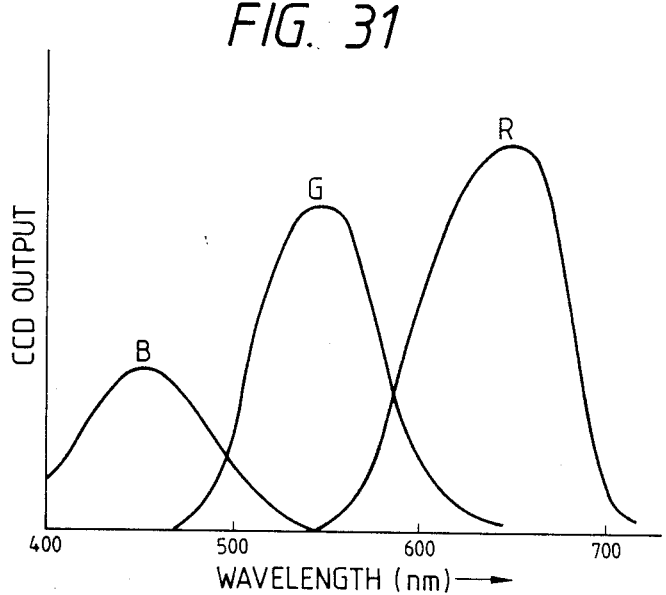
FIG. 31 is a graph showing corrected total sensitivity characteristics.

That is, total sensitivity characteristics shown in FIG. 31 can be obtained wherein the blue output level is doubled as compared with the characteristics in FIG. 15.

An output ratio of R:G:B: is set to be 5:4: 2. As compared with the case wherein the storage times of the three CCDs 43, 44, and 45 are identical, the power of the light source for obtaining the blue output having a predetermined level can be reduced into half. In this embodiment, ND filters are inserted into the CCD 45 having the R filter and the CCD 44 having the G filter to obtain an output ratio of R:G:B being 2.5 :2:2, thereby producing signals of three colors having substantially identical levels.

Outputs from the CCDs 43, 44, and 45 are supplied to the driving and processing circuit shown in FIG. 29. The identical operations are performed for the B, G, and R components in FIG. 29, so that the circuit operations are represented by processing of the output signal from the CCD 43 having the B filter.

The blue output from the CCD 43 is input to the S/H circuit 410, and a noise component is removed therefrom. The noise-free signal is amplified by the amplifier 411 to match the R, G, and B sensitivity levels and to perform signal processing. That is, the output signal from the CCD has a voltage of about 0.2 V, and is amplified by about 10 times to obtain a voltage of 2 V. The amplified signal is clamped by the clamp circuit 412 to reproduce a black level. The clamped signal is then converted by the A/D converter 413 into 8-bit digital data in units of pixels.

The video signals converted into 8-bit digital signals in units of pixels and colors are processed into uniform signals by the shading & black correction circuits 402.

FIG. 32 shows an image processing circuit for receiving the digital video signals of the respective colors output from the circuits shown in FIG. 29 and for performing processing for color image recording. In the block diagram of FIG. 32, the CCDs 43, 44, and 45 are arranged at intervals 180 μm as shown in FIG. 28, and the main scanning pixel pitch is 10 μm. Scanning of each line is performed with an 18-line delay between the adjacent CCDs. The CCD 43 having the B filter is subjected to a 36-line delay with respect to the CCD 45 having the R filter. More specifically, the CCD 43 has a storage time twice that of each of the CCDs 44 and 45, so that 18-line data allows a 36-line delay. When the output from the CCD 43 is delayed by 18 lines and the output from the CCD 44 is delayed by 18 lines, the outputs from the CCDs 43 and 44 can match with the output from the CCD 45, so that data obtained by reading the same line on the original can be extracted. The outputs from the CCDs 43 and 44 are delayed by 18-line memories 501B and 501G, respectively.

Figure 33:
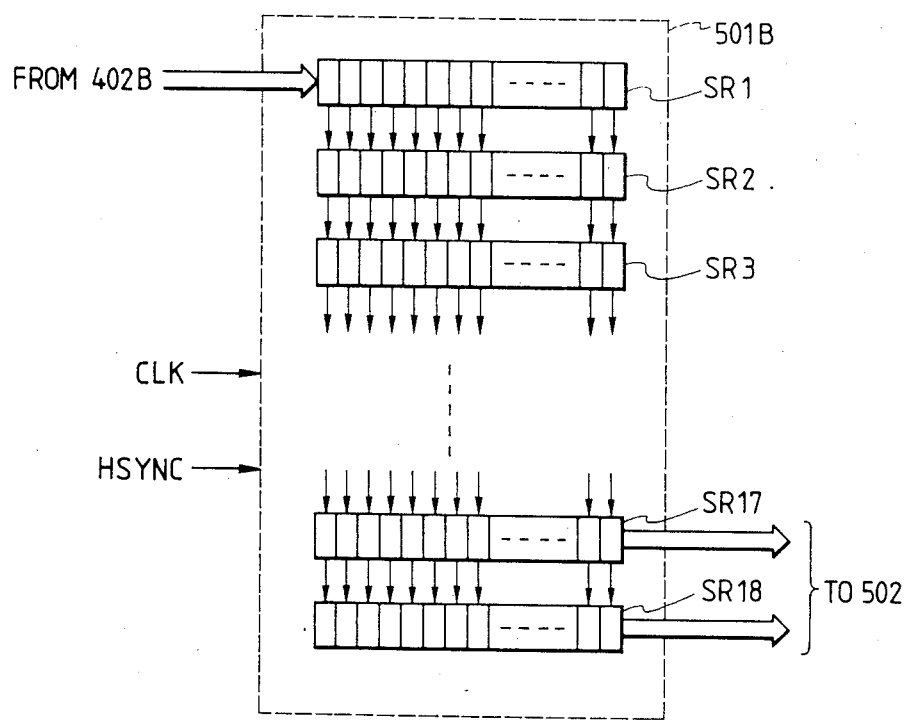
FIG. 33 is a diagram showing an 18-line memory.

FIG. 33 is a block diagram of the 18-line memory 501B or 501G. Since the 18-line memories 501B and 501G have the same arrangements, the arrangement can be represented by one of the memories, 501B in FIG. 33. The 18-line memory 501B is arranged by connecting eighteen 5,000-bit (stage) shift registers SR1 to SR18 in parallel with each other. Outputs from the 17th-line shift register SR17 and the 18th-line shift register SR17 can be extracted.

The 8-bit digital blue signal input from the shading & black correction circuit 402B in FIG. 29 is stored in the first-line shift register SRI in units of lines (5,000 pixels/line) in response to a clock signal CLK. The one-line data stored in the shift register SRI is parallel-shifted to the second-line shift register SR2 in response to a horizontal sync signal HSYNC serving as a line sync signal. At the same time, data stored in the nth-line shift register SR is shifted to the (n+1)th-line shift register SR.

The 17-line shift register SR17 and the 18th-line shift register SR18 sequentially output one-line data in response to the clock signal CLK.

The 17-line delayed output is obtained from the shift register SR17, and the 18-line delayed output is obtained from the shift register SR18.

The 18-line memory 501B externally outputs the data from the shift registers SR17 and SR18, while the 18-line memory 501G externally outputs the data from only the shift register SR18.

The data of the 18 th- and 17-line shift registers SR18 and SR17 which are output from the 18-line memory 501B are input to the interpolation circuit 502. The interpolation circuit 502 generates data of a line between the 18th and 17th lines by using the 18th- and 17-line data. That is, by using the data of two adjacent lines, data of an intermediate point therebetween is estimated and determined, and the interpolation data for the line between the 17th and 18th lines is generated.

Figure 34:
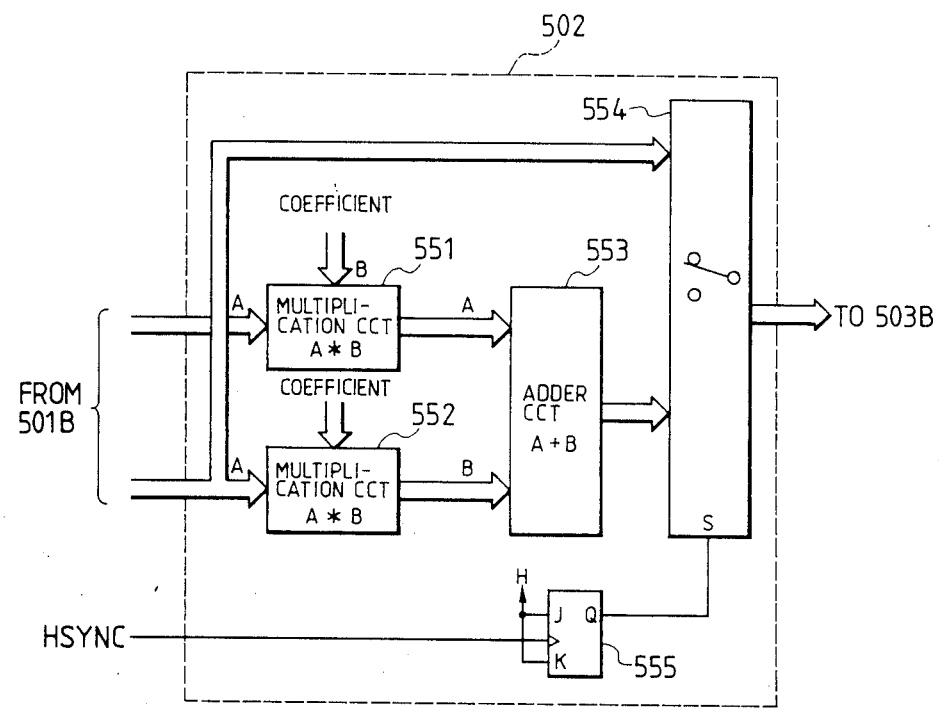
FIG. 34 is a block diagram of an interpolation circuit.

FIG. 34 shows an arrangement of the interpolation circuit 502, and its operation will be described below. A predetermined coefficient (e.g., 0.5) is multiplied with the nth data of the 17th line by a multiplication circuit 551. A predetermined coefficient (e.g., 0.5) is multiplied with the nth data of the 18th line by a multiplication circuit 552. Data from the multiplication circuits 551 and 552 are added by an adder circuit 553 to generate the nth interpolation data between the 17th and 18th lines.

The interpolation data thus generated and the actually read data are alternately output by a selector 554. More specifically, the selector 554 selects the data from the 18-line memory 501B or the data from the adder circuit 553 in response to the horizontal sync signal HSYNC. The selector 554 is controlled by an output from a flip-flop 555 which is inverted in response to the horizontal sync signal HSYNC.

The delayed and interpolated blue data is information having the same scanning line density as in the red and green data. The subsequent processing is conventional color processing to obtain information for color image printing.

The blue data from the interpolation circuit 502, the green data from the 18-line memory 501G, and the red data from the shading & black correction circuit 402R are input to light quantity/density conversion circuits 503B, 503G, and 503R, respectively. The light quantity/density conversion circuits 503 convert the blue data into yellow data, the green data into magenta data, and the red data into cyan data. The masking circuit 504 performs a matrix calculation using the data described above to eliminate undesirable color mixing caused by the filter characteristics. The data of the respective colors to be recorded at a printer 506 are extracted by a UCR.selector 505.

The insufficient sensitivity of the read output obtained through the B filter by using image sensors having the B, G, and R filters is compensated by the storage time to obtain a high-quality video signal having a high S/N ratio. In addition, a decrease in resolution caused by an increase in storage time is compensated by an interpolation technique, thereby preventing degradation of image quality. Therefore, the power of the light source for illuminating the original to increase the blue output need not be increased. A low-power light source can be used, and a temperature rise in an image reading apparatus can also be prevented.

In the above embodiment, the storage time of the CCD having the blue filter is doubled but may be n times (an integer multiple). For example, when the storage time is prolonged by 4 times, the sensitivity level can be improved by four times. In this state, the sensitivity of the blue component can be almost equal to that of the red or green component. Therefore, only fine adjustment of the gain can be performed, and optical sensitivity correction using the ND filters need not be performed. In this case, interpolation is performed on the basis of 3 lines to obtain an output having the same resolution as those of other CCD outputs.

In the above embodiment, two adjacent pixel data are used to generate interpolated data. However, the number of reference pixels may be increased to perform more accurate interpolation.

For example, upper, lower, right, and left pixels of a pixel of interest may be used to perform interpolation, or a SINC function may be used to perform interpolation, thereby performing more accurate interpolation.

In each of the embodiments described above, a reading apparatus using three line CCDs having filters of different colors is exemplified. However, the present invention can also be applied to a 2-line CCD structure for reading an image of two colors. For example, an image of black and red is to be read, one CCD filter need not have a filter, and the other CCD has a red filter, thereby separating the colors of the image. In this case, the CCD having the red filter has a lower sensitivity level than that of the CCD without any filter. Therefore, the storage time of the CCD having the red filter is prolonged to obtain high-quality image data.

As has been described above, the insufficient sensitivity is compensated by an increase in storage time to obtain a high-quality video signal having a high S/N ratio. In addition, a decrease in resolution caused by an increase in storage time can be prevented by interpolation. Therefore, the power of the light source need not be increased, and the temperature rise in the image reading apparatus can also be prevented.

The present invention has been described with reference to the preferred embodiments. However, the present invention is not limited to those embodiments. Various changes and modifications may be made within the spirit and scope of the appended claims.

What is claimed is:

1. A color image reading apparatus comprising:
a plurality of line sensors which have different color filters and each of which has a plurality of light receiving elements, one of said plurality of line sensors having an opening width larger than those of remaining ones of said plurality of line sensors;
correcting means for correcting image signals output from said plurality of line sensors so as to obtain identical resolutions of the image signals; and
processing means for performing color processing of the image signals corrected by said correcting means,
wherein said correcting means performs edge emphasis of the image signals output from the line sensor having the larger opening width.

2. A color image reading apparatus comprising:
a plurality of line sensors which have different color filters and each of which has a plurality of light receiving elements, one of said plurality of line sensors having an opening width larger than those of remaining ones of said plurality of line sensors;
correcting means for correcting image signals output from said plurality of line sensors so as to obtain identical resolutions of the image signals; and
processing means for performing color processing of the image signals corrected by said correcting means,
wherein said correcting means performs smoothing of the image signals output from the line sensor having a smaller opening width.

3. An apparatus according to claim 1 or 2, wherein a line sensor having a lower output signal level of said plurality of line sensors has a larger opening width.

4. An apparatus according to claim 1 or 2, wherein said one of said plurality of line sensors has a larger opening width than those of said remaining ones of said plurality of line sensors in a direction perpendicular to an alignment direction of said plurality of light receiving elements.

5. An apparatus according to claim 1 or 2, further comprising moving means for moving a read position of said plurality of line sensors on a color image to be read in a direction perpendicular to an alignment direction of said plurality of light receiving elements.

6. An apparatus according to claim 1 or 2, wherein said correcting means corrects a resolution in accordance with a read magnification of the image.

7. An apparatus according to claim 1 or 2, wherein said plurality of line sensors each have red filter (R), green filter (G) and blue filter (B), and the line sensor having the blue filter (B) has the larger opening width.

* * * * *

UNITED STATES PATENT AND TRADEMARK OFFICE
CERTIFICATE OF CORRECTION

PATENT NO. : 4,985,760

DATED : January 15, 1991

INVENTOR(S) : KATSUYOSHI MAESHIMA, ET AL.

It is certified that error appears in the above-identified patent and that said Letters Patent is hereby corrected as shown below:

TITLE PAGE:
IN [56] REFERENCES CITED

Attorney, Agent, or Firm: "Fitzpatrick, Cella Harper & Scinto" should read --Fitzpatrick, Cella, Harper & Scinto--.

COLUMN 1

Line 13, "Cds" should read --CdS--.
    Line 54, "20.8 µm (=1/16 mm X )." should read --20.8 µm (=1/16 mm X 1/3).--.
    Line 68, "like. As" should read --like. ¶ As--.

COLUMN 3

Line 1, "th" should read --the--.
    Line 37, "CCD" should read --CCDs--.
    Line 53, "invention to" should read --invention as--.
    Line 54, "provide" should read --provided--.

COLUMN 4

Line 3, "It is still another object" should read --According to another aspect--.

COLUMN 5

Line 34, "A" should read --As--.

UNITED STATES PATENT AND TRADEMARK OFFICE
CERTIFICATE OF CORRECTION

PATENT NO. : 4,985,760
DATED : January 15, 1991
INVENTOR(S) : KATSUYOSHI MAESHIMA, ET AL.

It is certified that error appears in the above-identified patent and that said Letters Patent is hereby corrected as shown below:

COLUMN 9

Line 2, "a" should read --as--.
    Line 46, "are volt-" should read --are converted by the output capacitors 904a and 904b into volt- --.
    Line 63, "output AV" should read --output $\Delta V$--.
    Line 65, "$\Delta V = Au \cdot \Delta Vv = (QS/CFD) \cdot (gmRs/(1+gmRs))$" should read --$\Delta V = Ar \cdot \Delta Vv = (Qs/CFD) \cdot (gmRs/(1+gmRs))$--.

COLUMN 10

Line 9, "an order of" should read --the order--.
    Line 12, "803 thereby" should read --803, thereby--.

COLUMN 11

Line 25, "ar" should read --are--.
    Line 49, "hold" should read --holding--.

COLUMN 12

Line 32, "43 and 44)." should read --44 and 45).--.

COLUMN 13

Line 33, "register SR17" should read --register SR18--.
    Line 55, "17-line" should read --17th-line--.

UNITED STATES PATENT AND TRADEMARK OFFICE
CERTIFICATE OF CORRECTION

PATENT NO. : 4,985,760
DATED : January 15, 1991
INVENTOR(S) : KATSUYOSHI MAESHIMA, ET AL.

It is certified that error appears in the above-identified patent and that said Letters Patent is hereby corrected as shown below:

COLUMN 14

Line 65, "three line" should read --three-line--.

COLUMN 15

Line 1, "CCD filter" should read --CCD--.

Signed and Sealed this

Twenty-fifth Day of August, 1992

Attest:

DOUGLAS B. COMER

Attesting Officer      Acting Commissioner of Patents and Trademarks